US010790097B2

United States Patent
Makino et al.

(10) Patent No.: US 10,790,097 B2
(45) Date of Patent: Sep. 29, 2020

(54) LITHIUM COMPOSITE NEGATIVE ELECTRODE AND HYBRID CAPACITOR, AND MANUFACTURING METHODS THEREOF

(71) Applicant: SHINSHU UNIVERSITY, Matsumoto-shi (JP)

(72) Inventors: Sho Makino, Ueda (JP); Wataru Sugimoto, Ueda (JP); Shigeyuki Sugimoto, Nagoya (JP)

(73) Assignee: SHINSHU UNIVERSITY, Matsumoto-shi (JP)

(*) Notice: Subject to any disclaimer, the term of this patent is extended or adjusted under 35 U.S.C. 154(b) by 40 days.

(21) Appl. No.: 16/133,011

(22) Filed: Sep. 17, 2018

(65) Prior Publication Data

US 2019/0019629 A1    Jan. 17, 2019

Related U.S. Application Data

(63) Continuation-in-part of application No. PCT/JP2017/010726, filed on Mar. 16, 2017.

(30) Foreign Application Priority Data

Mar. 18, 2016  (JP) .................................. 2016-055772

(51) Int. Cl.
*H01G 11/04* (2013.01)
*H01G 11/32* (2013.01)
(Continued)

(52) U.S. Cl.
CPC ............. *H01G 11/04* (2013.01); *H01G 11/06* (2013.01); *H01G 11/32* (2013.01); *H01G 11/38* (2013.01);
(Continued)

(58) Field of Classification Search
None
See application file for complete search history.

(56) References Cited

U.S. PATENT DOCUMENTS

2012/0088155 A1* 4/2012 Yushin .................... H01M 2/16
429/217
2014/0342225 A1 11/2014 Isshiki et al.
2016/0118647 A1* 4/2016 Bhagat .................. H01M 4/364
429/231.8

FOREIGN PATENT DOCUMENTS

CN    103839695 A    6/2014
CN    104952634 A    9/2015
(Continued)

OTHER PUBLICATIONS

Extended European Search Report dated Feb. 27, 2019 in European Patent Application No. 17766799.5, 7 pages.
(Continued)

*Primary Examiner* — Dion Ferguson
(74) *Attorney, Agent, or Firm* — Oblon, McClelland, Maier & Neustadt, L.L.P.

(57) ABSTRACT

A lithium composite negative electrode which allows a hybrid capacitor to operate at room temperature by reducing interfacial resistance in the electrode, a hybrid capacitor comprising the composite negative electrode, and manufacturing methods thereof. The lithium composite negative electrode is a laminar electrode including a lithium ion conductive solid electrolyte, an alginate gel electrolyte, and lithium-doped carbon. Further, a hybrid capacitor includes a positive electrode including a carbon material and/or a metal oxide, the lithium composite negative electrode, and a neutral aqueous electrolyte filled between the positive electrode and the lithium composite negative electrode. The lithium composite negative electrode is configured as a laminar electrode including the lithium ion conductive solid electrolyte, the alginate gel electrolyte, and the lithium-doped carbon.

9 Claims, 8 Drawing Sheets

(51) Int. Cl.

| | | |
|---|---|---|
| *H01G 11/56* | (2013.01) | |
| *H01G 11/84* | (2013.01) | |
| *H01G 11/06* | (2013.01) | |
| *H01G 11/50* | (2013.01) | |
| *H01G 11/38* | (2013.01) | |
| *H01G 11/46* | (2013.01) | |
| *H01G 11/86* | (2013.01) | |
| H01M 4/62 | (2006.01) | |
| H01M 4/133 | (2010.01) | |
| H01M 4/583 | (2010.01) | |
| H01M 4/1393 | (2010.01) | |
| H01M 4/02 | (2006.01) | |

(52) U.S. Cl.
CPC ............ *H01G 11/46* (2013.01); *H01G 11/50* (2013.01); *H01G 11/56* (2013.01); *H01G 11/84* (2013.01); *H01G 11/86* (2013.01); *H01M 4/133* (2013.01); *H01M 4/1393* (2013.01); *H01M 4/583* (2013.01); *H01M 4/62* (2013.01); *H01M 2004/027* (2013.01)

(56) References Cited

FOREIGN PATENT DOCUMENTS

| | | |
|---|---|---|
| EP | 2 757 620 A1 | 7/2014 |
| JP | 2011-187320 A | 9/2011 |
| JP | 2011-238404 A | 11/2011 |
| JP | 2013-058365 A | 3/2013 |
| JP | 2013-201260 A | 10/2013 |
| JP | 2015-133296 A | 7/2015 |
| WO | WO 2013/146792 A1 | 10/2013 |

OTHER PUBLICATIONS

Written Opinion of the International Search Authority dated May 30, 2017 in PCT/JP2017/010726 (English Translation) (5 pages).

* cited by examiner

_(1)_

LITHIUM COMPOSITE NEGATIVE ELECTRODE AND HYBRID CAPACITOR, AND MANUFACTURING METHODS THEREOF

CROSS REFERENCE TO RELATED APPLICATIONS

This application is a Continuation-in-Part application of International Application No. PCT/JP2017/010726 filed Mar. 16, 2017, claiming priority based on Japanese Patent Application No. 2016-055772, filed Mar. 18, 2016, the contents of all of which are incorporated herein by reference in their entirety.

FIELD OF THE INVENTION

The present invention relates to a lithium composite negative electrode and a hybrid capacitor, and manufacturing methods thereof. More specifically, the present invention relates to a lithium composite negative electrode which allows a hybrid capacitor to operate at room temperature by reducing interfacial resistance in the electrode, a hybrid capacitor comprising the composite negative electrode, and manufacturing methods thereof.

BACKGROUND ART

An electric double layer capacitor is a capacitor that utilizes a phenomenon in which positive and negative charges are stored at the interface between a solid and a liquid. The electric double layer capacitor, having a large capacitance that is at least 10 times that of an electrolytic capacitor upon comparison, has been used as a storage device. Furthermore, the electric double layer capacitor, unlike a secondary battery, functions without migration of ions into the bulk of the electrode material during charge-discharge reactions, and thus offers the advantages of minimal deterioration in performance and a fast charging and discharging speed. Activated carbon having a large specific surface area is generally used as the electrode materials for electric double layer capacitors. As the electrolyte, aqueous and organic solutions (non-aqueous solutions, organic solvent-based solutions) are used. Aqueous electrolytes offer the advantage of low resistance and allows usage of an oxide electrode or a conductive polymer having a large capacitance, but has the disadvantage of low cell voltage. Organic electrolytes offers high cell voltage, but has the disadvantages of high internal resistance and high price compared to aqueous electrolytes.

As an already proposed storage device, for example, in Patent Document 1 there is proposed a hybrid capacitor that offers safety and durability, and is capable of obtaining a high energy density with high cell voltage. This hybrid capacitor comprises at least a positive electrode made of a carbon material or a metal oxide, a negative electrode configured by a lithium composite electrode, and a neutral aqueous electrolyte between the positive electrode and the lithium composite electrode. Then, the lithium composite electrode is configured as a laminar electrode comprising a lithium ion conducting solid electrolyte, a polymer electrolyte, and a lithium film as the active material.

Further, as another storage device, in Patent Document 2 there is proposed a rechargeable lithium-ion battery that suppresses the growth of lithium dendrites, resulting in a long service life and high safety. This rechargeable lithium-ion battery comprises a first layer that is made of a material having lithium ion conductivity and protects the negative electrode active material layer, and a second layer provided between the negative electrode active material layer and the first layer. The second layer is a solid-liquid mixture having lithium ion conductivity, and this solid-liquid mixture contains a polymer comprising a polyalkylene oxide chain, an ionic liquid having tolerance to reduction from the active negative electrode material layer, and lithium salt.

In such a storage device, safety (non-volatile and non-flammable) and high output characteristics are required. In response to this demand, in Patent Document 3 there is proposed an electrolyte having suppressed flowability and suppressed deterioration of electrical characteristics in electrochemical devices. This electrolyte can be realized by an electrolyte containing an ionic liquid and alginic acid.

Further, for example, in Patent Document 4 there is proposed a non-aqueous gel electrolyte having lithium ion conductivity and high output characteristic equal or superior to that of a liquid electrolyte. This non-aqueous gel electrolyte contains chitosan salt or chitin salt and alginic acid, or alginate, an ionic liquid, and lithium salt.

Patent Documents

Patent Document 1: WO 2013/146792
Patent Document 2: Japanese Laid-Open Patent Application No. 2011-238404
Patent Document 3: Japanese Laid-Open Patent Application No. 2011-187320
Patent Document 4: Japanese Laid-Open Patent Application No. 2013-58365

SUMMARY OF THE INVENTION

Problems to be Solved by the Invention

A hybrid capacitor is promising as a storage device having a large capacitance and capable of quick charging, and research and development related thereto have been carried out in various fields, especially for lithium-ion capacitors. Lithium-ion capacitors to date have had an actual operating temperature of around 60° C. with use of a lithium composite negative electrode, and this operating temperature needs to be lowered to room temperature or below for practical usage. Nevertheless, the conductivity of the LTAP ($Li_{1+x+y}Ti_{2-x}Al_xP_{3-y}O_{12}$) used in the lithium composite negative electrode and the polymer electrolyte, and the interfacial resistance between these materials significantly affect the operating temperature, resulting in a very problematic, extremely high interfacial resistance at room temperature.

The present invention has been made to solve the above-described problems. It is therefore an object of the present invention to provide a lithium composite negative electrode which allows operation at room temperature by reducing interfacial resistance in the electrode, a hybrid capacitor comprising the lithium composite negative electrode, and manufacturing methods thereof.

Means for Solving the Problems (1) A lithium composite negative electrode according to the present invention is a laminar electrode comprising a lithium ion conductive solid electrolyte, an alginate gel electrolyte, and a lithium-doped carbon.

According to the present invention, a lithium ion conductive solid electrolyte is used with an alginate gel electrolyte instead of polymer electrolyte, and lithium-doped carbon is used as a negative electrode material, thereby reducing an interfacial resistance in the electrode. This makes it possible to achieve operation of a hybrid capacitor at room temperature.

(2) A method for manufacturing a lithium composite negative electrode according to the present invention is a method for manufacturing a laminar electrode comprising a lithium ion conductive solid electrolyte, an alginate gel electrolyte, and a lithium-doped carbon, the method comprising the steps of electrically connecting a working electrode and a counter electrode in an aqueous electrolyte containing lithium ions using a laminar electrode comprising the lithium ion conductive solid electrolyte, the alginate gel electrolyte, and a carbon material not doped with lithium as the working electrode, performing galvanostatic or potentiostatic electrolysis, and doping lithium into the carbon material not doped with lithium.

According to the present invention, it is possible to obtain a laminar electrode comprising a carbon material not doped with lithium, and subsequently dope lithium into the carbon material by performing electrolysis on the laminar electrode in an aqueous electrolyte containing lithium ions. This makes it possible to omit incorporation of a material doped with lithium in a separate step, and thus efficiently manufacture a lithium composite negative electrode.

(3) A hybrid capacitor according to the present invention comprises at least a positive electrode comprising one or both of a carbon material and a metal oxide, a lithium composite negative electrode, and a neutral aqueous electrolyte filled between the positive electrode and the lithium composite negative electrode. The lithium composite negative electrode is a laminar electrode comprising a lithium ion conductive solid electrolyte, an alginate gel electrolyte, and a lithium-doped carbon.

According to the present invention, it is possible to achieve operation of a hybrid capacitor at room temperature by a positive electrode comprising one or both of a carbon material and a metal oxide and capable of capacitor-like charge storage, a neutral aqueous electrolyte that is highly safe, and a lithium composite negative electrode that is stable in water and reduces the interfacial resistance in the electrode.

(4) A method for manufacturing a hybrid capacitor according to the present invention is a method for manufacturing a hybrid capacitor comprising at least a positive electrode comprising one or both of a carbon material and a metal oxide, a lithium composite negative electrode, and a neutral aqueous electrolyte filled between the positive electrode and the lithium composite negative electrode, the lithium composite negative electrode being a laminar electrode comprising a lithium ion conductive solid electrolyte, an alginate gel electrolyte, and a lithium-doped carbon. The method comprises the steps of forming a cell structure using a laminar electrode comprising a carbon material not doped with lithium in advance as the laminar electrode, electrically connecting the laminar electrode and the positive electrode in the aqueous electrolyte containing lithium ions, performing galvanostatic or potentiostatic electrolysis, and doping lithium into the carbon material not doped with lithium.

According to the present invention, it is possible to form a cell structure using a laminar electrode comprising a carbon material not doped with lithium in advance as the laminar electrode, and subsequently dope lithium into the carbon material by performing electrolysis on the laminar electrode in an aqueous electrolyte containing lithium ions. This makes it possible to omit incorporation of a material doped with lithium in a separate step, and thus efficiently manufacture a hybrid capacitor.

Effect of the Invention

According to the present invention, it is possible to provide a lithium composite negative electrode which allows a hybrid capacitor to operate at room temperature by reducing interfacial resistance in the electrode, and a hybrid capacitor comprising the composite negative electrode. As a result, practical use of a hybrid capacitor that is safe and durable and achieves a high energy density with high cell voltage can be expected. Further, according to the manufacturing methods of the lithium composite negative electrode and the hybrid capacitor according to the present invention, it is possible to omit incorporation of a material doped with lithium in a separate step and thus efficiently manufacture a hybrid capacitor.

EMBODIMENTS OF THE INVENTION

A lithium composite negative electrode and a hybrid capacitor, and manufacturing methods thereof according to the present invention will now be described with reference to the drawings. The present invention, however, is not limited to the following embodiments in the range included in the technical scope thereof, and may be implemented in various forms. In the following, the lithium composite negative electrode is described in the description sections of the components of the hybrid capacitor.

[Hybrid Capacitor]

Figure 1:
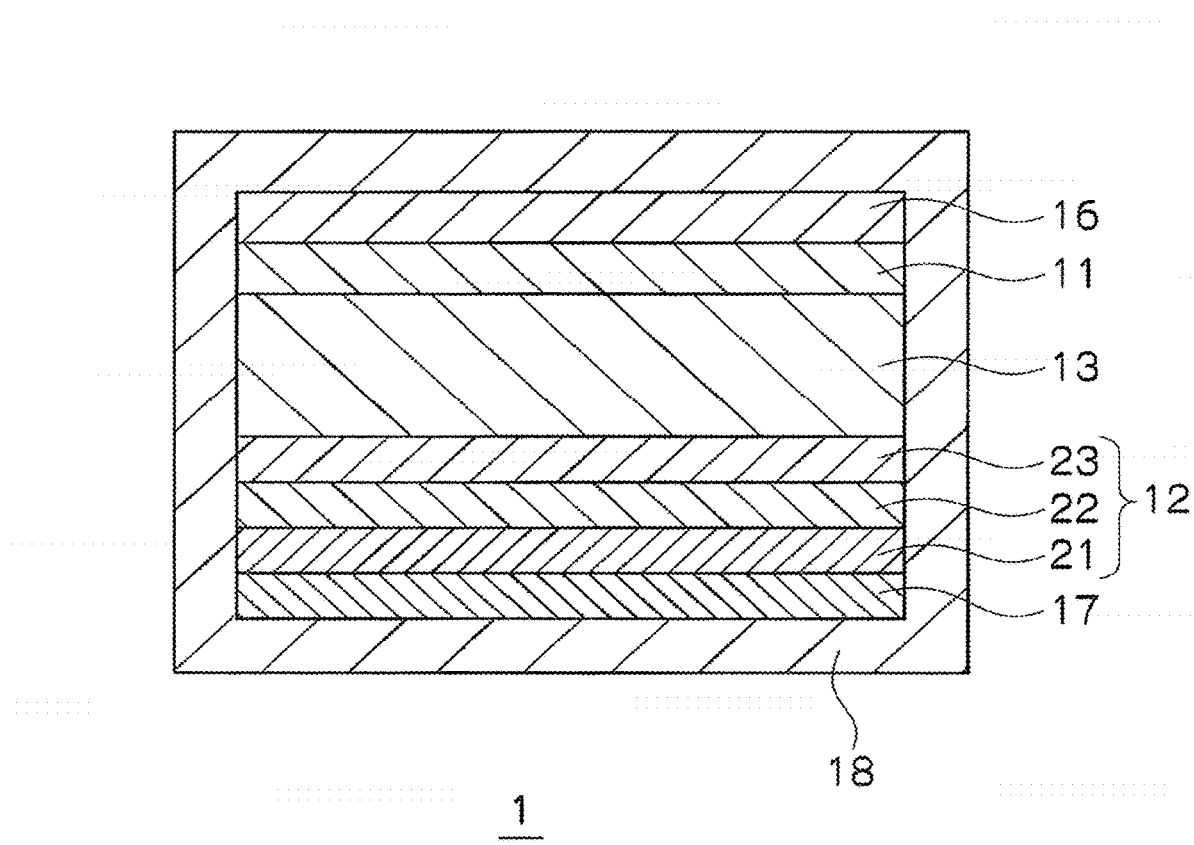
FIG. 1 is a schematic view illustrating a configuration of a hybrid capacitor according to the present invention.

A hybrid capacitor 1 according to the present invention, as illustrated in FIG. 1, comprises at least a positive electrode 11 comprising one or both of a carbon material and a metal oxide, a lithium composite negative electrode 12, and a neutral aqueous electrolyte 13 filled between the positive electrode 11 and the lithium composite negative electrode 12. In the present invention, the lithium composite negative electrode 12 is a laminar electrode comprising a lithium ion conductive solid electrolyte 23, an alginate gel electrolyte 22, and a lithium-doped carbon 21.

This hybrid capacitor 1 achieves the advantage of allowing operation at room temperature (for example, about 20° C. to 30° C.; hereinafter the same) by the positive electrode 11 comprising one or both of a carbon material and a metal oxide and capable of capacitor-like charge storage, the neutral aqueous electrolyte 13 that is highly safe, and the lithium composite negative electrode 12 that is stable in water and reduces interfacial resistance in the electrode.

Hereinafter, the components of the hybrid capacitor are described in detail.

<Lithium Composite Negative Electrode>

The lithium composite negative electrode 12, as illustrated in FIG. 1, is a laminar electrode comprising the lithium ion conductive solid electrolyte 23, the alginate gel electrolyte 22, and the lithium-doped carbon 21. The lithium composite negative electrode 12 comes into contact with the aqueous electrolyte 13 described later, and acts to occlude and release metal ions that cause a redox reaction.

(Lithium-Doped Carbon)

The lithium-doped carbon 21 is generally used along with metal lithium or a lithium alloy as one type of lithium-containing active material layer. In the lithium composite negative electrode 12 according to the present invention, the lithium-doped carbon 21 and the alginate gel electrolyte 22 are combined, making it possible to achieve a reduction in the interfacial resistance in the electrode, which could not be achieved by a combination of the lithium-doped carbon 21 and another lithium-containing active material layer. When such a lithium composite negative electrode 12 obtained by combining the lithium-doped carbon 21 and the alginate gel electrolyte 22 is used as a component of the hybrid capacitor 1, operation of the hybrid capacitor 1 can be achieved at room temperature.

Examples of the carbon material constituting the lithium-doped carbon 21 include graphitizable carbon, non-graphitizable carbon, graphite, and the like. Examples of the graphitizable carbon include pyrolytic carbons or cokes such as pitch coke, needle coke, and petroleum coke. Examples of the non-graphitizable carbon include glassy carbon fibers, an organic polymer compound fired body, activated carbon, carbon black, and the like. Here, the organic polymer calcined compound is obtained by calcination and carbonizing a phenolic resin, furan resin, or the like at an appropriate temperature. An appropriate doping amount of lithium into the carbon material is 1 µg/cm² to 1 g/cm², inclusive. Note that the "carbon material" constituting the lithium-doped carbon 21 of the lithium composite negative electrode 12 and the "carbon material" constituting the positive electrode 11 described later are used with distinction, and the carbon material constituting the lithium-doped carbon 21 of the lithium composite negative electrode 12 may be referred to as "carbonaceous material."

With the lithium-doped carbon 21, as shown in the formula below, lithium ions are released from the carbon material when a discharging voltage is applied to the hybrid capacitor 1. On the other hand, the lithium ions are intercalated into the carbon material when a charging voltage is applied, causing the lithium-doped carbon 21 to function as an active negative electrode material.

 [Formula 1]

Such a lithium-doped carbon 21 can make it difficult to deposit dendritic lithium crystals (dendrites) during charging and prevent the alginate gel electrolyte 22 provided on the lithium-doped carbon 21 from being short-circuited or adversely affected by the dendritic lithium crystals. As a result, the use of lithium-doped carbon 21 makes it possible to further enhance the durability and safety of the hybrid capacitor 1. Further, the lithium-doped carbon 21 is configured by a carbon material and thus, compared to when a metal lithium or a lithium alloy is used, it is possible to decrease the amount of lithium used and enhance the safety and reduce the cost of the hybrid capacitor 1.

Examples of the shape of the lithium-doped carbon 21 include a sheet shape, a film shape, and the like. A thickness of the lithium-doped carbon 21, while not particularly limited, is within a range of 0.1 to 3 mm, inclusive, for example.

(Alginate Gel Electrolyte)

The alginate gel electrolyte 22 is a gelatinous electrolyte obtained by impregnating alginate gel with lithium salt. The conventional lithium composite negative electrodes used include mainly polymers such as polyethylene oxide (PEO) and polypropylene oxide (PPO), and a polymer electrolyte obtained by adding a lithium salt to such a polymer is used. The lithium composite negative electrode 12 according to the present invention uniquely uses the alginate gel electrolyte 22 obtained by crosslinking an alginic acid to form a gel, and then impregnating the gel with a lithium salt.

Alginic acid has a basic molecular structure of polymer polysaccharides that include 1,4-bonded β-D-mannuronic acid and α-L-guluronic acid. The alginic acid may be an alginic acid in which the carboxyl group has a free acid form, or may be a form of alginate. Examples of the alginate include monovalent alginates such as potassium alginate, sodium alginate, and ammonium alginate, as well as divalent or higher alginates such as calcium alginate, magnesium alginate, and iron alginate. Note that, while the raw material of the alginic acid is not particularly limited, examples include brown alga plants such as kelp, seaweed, and *Ecklonia cava*, and the alginic acid may be obtained by processing or extracting these.

Alginate gel, as described later, can be obtained by crosslinking the alginic acid. With a gel form, there is the advantage that flowability is further suppressed and the electrical characteristics of the hybrid capacitor 1 are less likely to deteriorate (due to loss or leakage of electrolyte solution, for example). While the crosslinking agent is not particularly limited, sulfuric acid or the like, for example, can be used.

Examples of the lithium salt to be impregnated generally include $LiPF_6$, $LiClO_4$, $LiBF_4$, LiTFSI ($Li(SO_2CF_3)_2N$), $Li(SO_2C_2F_5)_2N$, LiBOB (lithium bisoxalato borate), and the like. According to the alginate gel electrolyte 22 used in the present invention, among these, LiTFSI ($Li(SO_2CF_3)_2N$) is used, and impregnation is performed using PP13TFSI (N-methyl-N-propylpiperidinium bis(trifluoromethanesulfonyl)imide) as a solvent. Note that, as long as within a range of not inhibiting the advantages of the present invention, the material used may be combined with other lithium salts.

The alginate gel electrolyte 22 may be combined with other compounds in consideration of mechanical properties (strength of the gel, for example) and electrical characteristics (ion conductivity, for example), as long as within a range that does not inhibit the advantages of the present invention.

Such an alginate gel electrolyte 22 is placed between the lithium-doped carbon 21 and the lithium ion conductive solid electrolyte 23, making it possible to prevent the lithium-doped carbon 21 and the lithium ion conductive solid electrolyte 23 from coming into direct contact and reacting with each other. As a result, the alginate gel electrolyte 22 is also capable of contributing to lengthening the service life of the hybrid capacitor 1.

(Example of Method for Preparing Alginate Gel Electrolyte)

The alginate gel electrolyte 22 is prepared by introducing and spreading 3 mass % of sodium alginate (trade name: NSPH2, manufactured by Food Chemifa Company) aqueous solution on a flat glass plate, immersing this in sulfuric acid aqueous solution to obtain a sulfated alginic acid, and subsequently holding the preparation for several minutes at room temperature to execute crosslinking and form a gel. Next, the hydrated gelatinous film is washed and immersed in ethanol. Furthermore, the gelatinous film is impregnated with a solution containing LiTFSI (Li(SO$_2$CF$_3$)$_2$N) and PP13TFSI (N-methyl-N-propylpiperidinium bis(trifluoromethanesulfonyl)imide) or P13FSI (N-methyl-N-propylpiperidinium bis(fluoromethanesulfonyl)imide). Subsequently, the gelatinous film is vacuum-dried. Thus, the alginate gel electrolyte 22 can be prepared. Here, crosslinking may be performed using CaCl$_2$. Additionally, the solution to be impregnated may be a solution containing LiFSI (Li(SO$_2$F)$_2$N) and P13FSI (N-methyl-N-propylpiperidinium bis(fluoromethanesulfonyl)imide). Note that the preparation method described herein is merely one example, and the alginate gel electrolyte 22 may be prepared using other methods.

The alginate gel electrolyte 22 is preferably prepared using an aqueous solution of alginic acid within a range of 1 to 3 mass %, inclusive. The use of alginic acid within this range offers the advantage of suppressing deterioration in electrochemical characteristics (ion conductivity, for example). When the content of alginic acid is less than 1 mass %, the degree of gelling decreases, increasing flowability, and thus the strength of the film may decrease. When the content of alginic acid exceeds 5 mass %, the degree of gelling is too high, causing solidification, and thus formation of a thin film may become more difficult.

The sulfuric acid used for crosslinking can be used in a concentration of, for example, 0.1 to 1.0 mol/L, inclusive. Further, impregnation into ethanol is preferably performed by immersing the film in a large excess of ethanol for a long period of time since the purpose of impregnation is to remove moisture as well as free ions. The LiTFSI (Li(SO$_2$CF$_3$)$_2$N) to be subsequently impregnated is preferably used in a concentration of, for example, 0.2 to 1.5 mol/L, inclusive. With the LiTFSI in this concentration range, deterioration of electrochemical characteristics (ion conductivity, for example) can be suppressed.

The vacuum drying conditions are not particularly limited. However, vacuum drying is preferably performed for about 48 hours at a vacuum degree of about $10^{-2}$ Pa and a temperature of about 70° C., for example.

The thickness of the alginate gel electrolyte 22, while not particularly limited as well, is preferably, for example, within a range of 0.1 to 1 mm, inclusive. Such a thickness is set in consideration of cell performance, such as resistance and volumetric capacity.

(Lithium Ion Conductive Solid Electrolyte)

The lithium ion conductive solid electrolyte 23 has lithium ion conductivity, is water-impermeable, and acts to isolate the aqueous electrolyte 13 and the lithium composite negative electrode 12.

The lithium ion conductive solid electrolyte 23 is preferably a sodium superionic conductor (NASICON) type lithium ion conductor having water resistance and lithium ion conductivity. Specifically, examples of the lithium ion conductive solid electrolyte 23 include $Li_{1+x}Ti_2Si_xP_{3-x}O_{12} \cdot AlPO_4$ (trade name: LICGC, Ohara Inc.), $Li_{1.5}Al_{0.5}Ge_{1.5}(PO_4)_3$ (LAGP), $Li_{1+x+u}Al_xTi_{2-x}P_{3-y}Si_yO_{12}$ (LATP), garnet-type oxide $Li_7La_3Zr_2O_{12}$, LiPON, and the like. This lithium ion conductive solid electrolyte 23 preferably has a sheet or plate shape, and a thickness usually within a range of 0.02 to 0.5 mm, inclusive.

Note that the lithium composite negative electrode 12 is usually provided on a negative electrode current collector 17. A conventional current collector may be applied as the negative electrode current collector 17, as desired.

Thus, the lithium composite negative electrode 12, which is a laminar electrode comprising the lithium ion conductive solid electrolyte 23, the alginate gel electrolyte 22, and the lithium-doped carbon 21, makes it possible to reduce the interfacial resistance in the electrode and realize operation of the hybrid capacitor 1 at room temperature, as described in detail in the examples described later.

<Neutral Aqueous Electrolyte>

The neutral aqueous electrolyte 13 is an electrolyte that is aqueous and neutral and filled between the positive electrode 11 and the lithium composite negative electrode 12, and is preferably applied to the hybrid capacitor 1 according to the present invention.

Examples of the neutral aqueous electrolyte 13 include an aqueous electrolyte obtained by dissolving an alkali metal salt. Examples of the alkali metal salt include inorganic acid salts and organic acid salts, such as LiCl, LiNO$_3$, Li$_2$SO$_4$, Li$_2$CO$_3$, Li$_2$HPO$_4$, LiH$_2$PO$_4$, LiCOOCH$_3$, LiCOO(OH)CHCH$_3$, Li$_2$C$_2$O$_2$, NaCl, Na$_2$SO$_4$, KCl, and K$_2$SO$_4$. Further, the neutral aqueous electrolyte 13 may be an aqueous electrolyte obtained by mixing a plurality of these alkali metal salts and adjusting to neutrality, or a buffered aqueous electrolyte by mixing an alkali metal salt and an acid or a base. A buffered aqueous electrolyte has a stable pH in the charge-discharge process, and can enhance the safety and durability of the hybrid capacitor 1.

Examples of the buffered neutral aqueous electrolyte 13 include a lithium dihydrogen phosphate-lithium hydroxide (LiH$_2$PO$_4$—LiOH) solution (pH 6.87), a lithium acetate-acetic acid (CH$_3$COOLi—CH$_3$COOH) solution (pH 5.41), and the like.

The neutral aqueous electrolyte 13 is a stable electrolyte that does not impart damage to the lithium composite negative electrode 12 or the positive electrode 11. Further, the neutral aqueous electrolyte 13 does not present difficulties in handling, such as with a non-aqueous electrolyte that uses a solvent other than water, and thus allows realization of a reduction in cost of the hybrid capacitor 1.

The neutrality of the neutral aqueous electrolyte 13 is within a range of pH 5 to pH 8.5, inclusive, and preferably within a range of pH 5 to pH 8, inclusive. Further, the salt concentration in the neutral aqueous electrolyte 13 is preferably 0.01 to 5 mol/L, inclusive.

<Positive Electrode>

The positive electrode 11 comprises one or both of a carbon material and a metal oxide, and comes into contact with the neutral aqueous electrolyte 13 described above to obtain an electric double layer capacitance and a reversible redox capacitance. Specifically, as long as the positive electrode 11 comprises one or both of a carbon material and a metal oxide which can cause a reversible redox reaction, the positive electrode 11 may be configured by a metal oxide alone, a metal oxide and a binder material, or a metal oxide, a binder material, and a conductive material. Further, the positive electrode 11 may be configured by a carbon material alone, a carbon material and a binder material, or a carbon material, a binder material, and a conductive material. Furthermore, the positive electrode 11 may be configured by both a metal oxide and a carbon material.

Examples of the carbon material are various, and preferably include activated carbon, acetylene black, carbon nanotubes, graphite, conductive diamond, graphene, and the like. These carbon materials may be used singly or in combination of two or more. Further, various metal oxides may be applied as long as the metal oxide can cause a reversible redox reaction. Examples of the metal oxide include manganese oxide, ruthenium oxide, lead oxide, tungsten oxide, cobalt oxide, tin oxide, nickel oxide, molybdenum oxide, titanium oxide, iridium oxide, vanadium oxide, indium oxide, and the like, as well as the hydrates thereof These metal oxides may be used singly or in combination of two or more. Preferable examples include manganese oxide, ruthenium oxide, lead oxide, and the like.

Note that, as the binder material and conductive material, conventionally known materials can be applied. Binder materials such as fluorine-based resins, thermoplastic resins, ethylene-propylene-diene monomer, and natural butyl rubber, for example, can be used as desired. As the conductive material, for example, natural graphite, artificial graphite, acetylene black, carbon black, ketjen black, carbon whisker, needle coke, carbon fibers, metal powder or fiber, and the like may be used. These binder materials and conductive materials may be used singly or in combination of two or more.

Further, the positive electrode 11 may comprise a sheet containing one or both of a carbon material and a metal oxide, and a metal oxide film provided on at least the surface of the sheet. Specifically, the sheet may be configured by a metal oxide alone, a metal oxide and an additive such as a binder material, a carbon material alone, or a carbon material and an additive such as a binder material. Furthermore, the sheet may contain both a metal oxide and a carbon material.

Examples of the sheet containing a carbon material include a sheet formed by carbon fibers, and specifically a cloth form or the like formed by carbon fibers. Examples of the sheet containing both a metal oxide and a carbon material include a sheet obtained by forming a material obtained by kneading a metal oxide and a carbon material into a sheet shape, or the like. Examples of the binder contained in the sheet include a fluororesin-based material, a styrene-butadiene rubber based material, and the like.

A metal oxide film is preferably provided on at least the surface of the sheet. For example, a metal oxide film may be provided only on the surface of the sheet, or may be provided on the surface of the sheet as well as inserted into the interior of the sheet. Further, for example, when the sheet is formed by carbon fibers, the metal oxide film may be provided so as to cover the surface of each carbon fiber. The hybrid capacitor 1 that uses the positive electrode 11 provided with a metal oxide film on the surface of each carbon fiber is capable of achieving characteristics that highly reflect the properties of the metal oxide of the positive electrode 11.

Examples of the method for forming the metal oxide film include thin film forming methods such as an electrodeposition method, an electrophoresis method, a chemical vapor deposition (CVD) method, a sputtering method, and a vacuum deposition method. Among these, the electrodeposition method can form a metal oxide film in a relatively short time, and is thus advantageous in enhancing the manufacturing efficiency of the hybrid capacitor 1.

The shape of the positive electrode 11, while not particularly limited, is usually preferably a sheet or plate shape. The thickness of the positive electrode 11, while not particularly limited as well, is within a range of 1 nm to 10 mm, inclusive, for example. Note that the positive electrode 11 is usually provided on a positive electrode current collector 16. A conventionally known collector may be applied as the positive electrode current collector 16, as desired.

<Hybrid Capacitor>

The hybrid capacitor 1 comprising at least the positive electrode 11, the lithium composite negative electrode 12, and the neutral aqueous electrolyte 13 described above, may be provided with other constituent materials and structural parts as necessary. The size and the shape of the hybrid capacitor 1 are not particularly limited. Examples of the shape include a coin type, a button type, a sheet type, a laminate type, a cylindrical type, a flat type, a rectangular type, and the like.

As described above, according to the present invention, it is possible to provide the lithium composite negative electrode 12 which allows the hybrid capacitor 1 to operate at room temperature by reducing the interfacial resistance in the electrode, and the hybrid capacitor 1 comprising the composite negative electrode 12. As a result, practical use of the hybrid capacitor 1 that is safe and durable and achieves a high energy density with high cell voltage can be expected.

<Method for Pre-Doping Lithium in the Carbon Material>

The following describes a method for preparing the lithium-doped carbon 21 constituting the lithium composite negative electrode 12, and a method for manufacturing the lithium composite negative electrode 12 and the hybrid capacitor 1.

A general method for preparing the lithium-doped carbon 21 is a method for doping lithium into a carbon material such as graphite by performing electrolysis in an electrolyte containing lithium. Specifically, conventionally the method comprises the steps of forming a sealed pre-doped cell with a non-aqueous lithium electrolyte placed along with a reference electrode between a counter electrode and a working electrode using metal lithium as the counter electrode and a carbon material as the working electrode, electrically connecting the counter electrode and the working electrode of the pre-doped cell, and performing galvanostatic electrolysis or potentiostatic electrolysis. The electrode potential of the working electrode before connection is 2.49 V (vs. $Li/Li^+$), and the electrode potential of the working electrode after connection and doping is 0.05 V (vs. $Li/Li^+$). Thus, after pre-doping lithium into the carbon material, the pre-doped cell is taken apart to obtain the lithium-doped carbon 21, and the lithium-doped carbon 21 is subsequently incorporated as a constituent material of the lithium composite negative electrode 12.

However, this conventional method requires many processes for pre-doped cell preparation and removal, and is very uneconomical and complex.

Here, with the lithium-doped carbon 21 used in the present invention, the safe and stable aqueous electrolyte 13 described above is used as the electrolyte. Further, the above-described positive electrode 11 is used as the counter electrode. The working electrode used is a laminar electrode comprising the lithium ion conductive solid electrolyte 23, the alginate gel electrolyte 22, and the carbon material (before doping lithium). The electrolyte and the pre-doped cell configured by the counter electrode and the working electrode use the aqueous electrolyte 13, and thus the cell can have a safe and stable cell structure. The carbon material constituting the working electrode is doped with the Li' in the aqueous electrolyte by electrically connecting the counter electrode and the working electrode of the pre-doped cell and performing galvanostatic or potentiostatic electrolysis. Thus, the carbon material becomes the lithium-doped carbon 21, and the above-described laminar electrode becomes the lithium composite negative electrode 12 according to the present invention.

The method for pre-doping lithium into the carbon material used in the present invention makes it possible to solve such preparation and removal processing problems as those of conventional methods, and can be preferably utilized as a safe, stable and low cost method.

Further, in particular, in a case where a hybrid capacitor comprises a lithium composite negative electrode not doped with lithium in advance, it is possible to perform galvanostatic or potentiostatic electrolysis before charging and discharging and dope the $Li^+$ in the aqueous electrolyte into the carbon material. This makes it possible to perform doping very efficiently. According to this method, efficient methods for manufacturing a lithium composite negative electrode and hybrid capacitor are achieved.

For example, in the method for manufacturing a lithium composite negative electrode 12, a laminar electrode comprising the lithium ion conductive solid electrolyte 23, the alginate gel electrolyte 22, and the carbon material not doped with lithium is used as the working electrode. Then, in the aqueous electrolyte containing lithium ions, the working electrode and the counter electrode are electrically connected, and galvanostatic or potentiostatic electrolysis is performed. In this way, the carbon material not doped with lithium can be doped with lithium. As a result, by such means, it is possible to omit incorporation of a material doped with lithium in a separate step, and efficiently manufacture the lithium composite negative electrode 12 configured by the laminar electrode comprising the lithium ion conductive solid electrolyte 23, the alginate gel electrolyte 22, and the lithium-doped carbon 21.

Further, the hybrid capacitor 1 comprises at least the positive electrode 11 comprising one or both of a carbon material and a metal oxide, the lithium composite negative electrode 12, and the neutral aqueous electrolyte 13 filled between the positive electrode 11 and the lithium composite negative electrode 12, and the lithium composite negative electrode 12 is a laminar electrode comprising the lithium ion conductive solid electrolyte 23, the alginate gel electrolyte 22, and the lithium-doped carbon 21. In this case, while a material already doped with lithium in an aqueous electrolyte or non-aqueous electrolyte may be incorporated as the lithium composite negative electrode 12, a method for forming the lithium composite negative electrode 12 described above by incorporating the laminar electrode comprising a carbon material not doped with lithium, and then doping lithium into the carbon material may be used.

Specifically, when constructing the cell structure of the hybrid capacitor 1, similar to the case of the above-described lithium composite negative electrode 12, a laminar electrode comprising a carbon material not doped with lithium is used to form the cell structure in advance, the laminar electrode and the positive electrode 11 are electrically connected in the neutral aqueous electrolyte 13 containing lithium ions, and galvanostatic or potentiostatic electrolysis is performed. With this electrolysis, the carbon material not doped with lithium is doped with lithium, making it possible to obtain the lithium composite negative electrode 12. Thus, eventually the hybrid capacitor 1 that includes the lithium composite negative electrode 12 can be obtained. This method for manufacturing the hybrid capacitor 1 allows omission of incorporation of the lithium composite negative electrode 12 doped with lithium in a separate step, making it possible to efficiently manufacture the hybrid capacitor 1 that includes the lithium composite negative electrode 12.

EXAMPLES

In the following, the present invention will be described specifically by experimental examples and comparative examples.

Comparative Example 1: Lithium Composite Negative Electrode A

A lithium composite negative electrode A of Comparative Example 1 was configured using a metal lithium as the negative electrode active material layer 21, PEO-LiTFSI-$BaTiO_3$ as the polymer electrolyte 22, and LTAP (lithium ion conductive solid electrolyte) as the solid electrolyte 23.

First, metal lithium (dimensions: thickness of 0.2 mm, height of 5 mm, width of 5 mm, negative electrode active material layer) was placed on one end of a metal nickel foil (dimensions: thickness of 0.1 mm, width of 5 mm, length of 150 mm, the negative electrode current collector 17; hereinafter the same). On this metal lithium, a composite sheet (polymer electrolyte) made of PEO (manufactured by Sigma-Aldrich Co. LLC; hereinafter the same)—LiTFSI (lithium bistrifluoromethanesulfonylimide, $Li(CF_3SO_2)_2N$ (manufactured by Wako Pure Chemical Corporation; hereinafter the same)—$BaTiO_3$ (manufactured by Sigma-Aldrich Co. LLC; hereinafter the same)) cut into a 6-mm square, was stacked. Furthermore, LTAP (LICGC, lithium ion conductive glass ceramics, Ohara Inc., thickness of 0.15 mm, lithium ion conductive solid electrolyte 23; hereinafter the same) cut into a 10-mm square was stacked thereon. Thus, the lithium composite negative electrode A of Comparative Example 1 was prepared.

This lithium composite negative electrode A was sandwiched to be positioned at the center between two aluminum films cut into 100-mm squares, and sealed by laminating the four sides using a laminator. A 5-mm square hole was cut-out in the laminate film in contact with the LTAP, forming a measurement window where the LTAP will be in contact with the aqueous electrolyte 13. The nickel foil drawn from one side of the four sides of the lithium composite negative electrode A was used as the negative electrode current collector 17 of the lithium composite negative electrode A.

Comparative Example 2: Lithium Composite Negative Electrode B

A lithium composite negative electrode B of Comparative Example 2 was configured using a metal lithium as the negative electrode active material layer 21, PEO-LiTFSI-PP13TFSI (manufactured by Kanto Chemical Industry Co., Ltd.; hereinafter the same) as the polymer electrolyte 22, and LTAP as the solid electrolyte 23.

For this lithium composite negative electrode B, PEO-LiTFSI-PP13TFSI was used as the polymer electrolyte 22 instead of PEO-LiTFSI-$BaTiO_3$ in Comparative Example 1. Otherwise, all was the same as in Comparative Example 1. Thus, the lithium composite negative electrode B of Comparative Example 2 was prepared. Even with the lithium composite negative electrode B, lamination was performed in the same manner as in Comparative Example 1, providing the measurement window where LTAP will be in contact with the aqueous electrolyte 13.

Comparative Example 3: Lithium Composite Negative Electrode C

A lithium composite negative electrode C of Comparative Example 3 was configured using the lithium-doped carbon 21 as the negative electrode active material layer 21, PEO-LiTFSI-PP13TFSI as the polymer electrolyte 22, and LTAP as the solid electrolyte 23.

In this lithium composite negative electrode C, the lithium-doped carbon 21 was placed on one end of the metal nickel foil serving as the negative electrode current collector 17, and PEO-LiTFSI-PP13TFSI cut into a 6-mm square was stacked as the polymer electrolyte 22 on the lithium-doped carbon 21. Furthermore, LTAP cut into a 10-mm square was stacked thereon. Thus, the lithium composite negative electrode C of Comparative Example 3 was prepared. Even with the lithium composite negative electrode C, lamination was performed in the same manner as in Comparative Example 1, providing the measurement window and the like where LTAP was in contact with the aqueous electrolyte 13.

(Preparation of Lithium-Doped Carbon)

A coating material of the lithium-doped carbon 21 used in the lithium composite negative electrode C was prepared by mixing 0.4 g of graphite powder (average particle size of less than 20 µm, manufactured by Sigma-Aldrich Co. LLC), 0.05 g of acetylene black, 0.05 g of polyvinylidene fluoride (manufactured by Sigma-Aldrich Co. LLC), and 1.25 mL of N-methyl-pyrrolidinone (manufactured by Kanto Chemical Co., Inc.) for 5 minutes. Next, this coating material was applied to a copper foil (thickness: 20 µm) at a thickness of 100 µm to form a coating film. Next, this coating film was dried for 1 hour at 60° C., and subsequently further air-dried. Next, the copper foil on which the coating film was formed was punched into a disk of 1 cm$^2$, and pressed for 1 minute at a pressure of 700 kg/cm$^2$. Subsequently, the coating film was vacuum-dried for 16 hours at 150° C. to obtain a graphite electrode with a graphite layer formed on the surface of the copper foil.

Next, using a charge-discharge measuring system (manufactured by Scribner Associates Inc., trade name: 580 Battery Test System), the graphite electrode was doped with lithium to obtain the lithium-doped carbon 21. Specifically, as the counter electrode of the charge-discharge measuring system, Li foil was used. As the electrolyte, a non-aqueous electrolyte (1 mol/L of LiPF$_6$/EC-DEC, manufactured by Kishida Chemical Co., Ltd.; hereinafter the same) obtained by dissolving 1 mol/L of LiPF$_6$ into a mixed solvent of ethylene carbonate (EC) and diethyl carbonate (DEC) (volume ratio: 1:1) was used. The graphite electrode thus prepared was used as the working electrode as mentioned above. Then, the Li foil and graphite electrode were short-circuited for 72 hours and doped with lithium in a graphite layer. Here, the spontaneous potential of the graphite electrode was 3.0 V (vs. Li/Li$^+$) at the start of short-circuiting, and 0 V (vs. Li/Li$^+$) at the end of short-circuiting. Note that doping may be performed using constant current mode until 0 V (vs. Li/Li$^+$) is reached at the rate of 0.05 C, or 26 hours have elapsed.

Example 1: Lithium Composite Negative Electrode D

A lithium composite negative electrode D of Example 1 was configured using a lithium-doped carbon as the negative electrode active material layer 21, alginate gel electrolyte as the polymer electrolyte 22, and LTAP as the solid electrolyte 23.

In this lithium composite negative electrode D, the lithium-doped carbon 21 was placed on one end of the metal nickel foil serving as the negative electrode current collector 17, and the alginate gel electrolyte cut into a 6-mm square was stacked as the polymer electrolyte 22 on the lithium-doped carbon 21. Furthermore, LTAP cut into a 10-mm square was stacked thereon. Thus, the lithium composite negative electrode D of Example 1 was prepared. Even with the lithium composite negative electrode D, lamination was performed in the same manner as in Comparative Example 1, providing the measurement window and the like where LTAP was in contact with the aqueous electrolyte 13.

(Preparation of Lithium-Doped Carbon)

As the lithium-doped carbon 21 used in the lithium composite negative electrode D, a graphite electrode prepared in the same manner as in Comparative Example 3 was used. Next, using this graphite electrode as a working electrode and the same charge-discharge measuring system as described above, the graphite electrode was doped with lithium to obtain the lithium-doped carbon 21. Specifically, the graphite layer was doped with lithium using Li foil as the counter electrode, 1 mol/L of LiPF$_6$/EC-DEC, which is a non-aqueous electrolyte, as the electrolyte, and the same constant current mode as in Comparative Example 3.

Note that, as the lithium-doped carbon 21, a material doped with lithium from the aqueous electrolyte was also applied. Specifically, as the positive electrode, a positive electrode obtained by providing activated carbon fibers (active material weight: 7.26 mg, manufactured by Gun Ei Chemical Industry Co., Ltd., Kynol activated carbon fiber ACC-507-20) on a titanium electrode was used. As the negative electrode, the same graphite electrode as described above was used. As the electrolyte, 1 mol/L of an aqueous lithium sulfate solution (25° C., pH 4.89), which is an aqueous electrolyte was used. As a reference electrode, a silver-silver chloride electrode was used. Then, an electrochemical cell was configured using these, and the graphite of the negative electrode was doped with lithium using this electrochemical cell. At this time, using constant current mode, doping was performed by introducing a current for 196 minutes at a rate of 0.2 C between the positive electrode and the negative electrode. In the evaluations below, while a lithium-doped carbon pre-doped with a non-aqueous electrolyte described above was used, achievement of the same results was confirmed with a lithium-doped carbon pre-doped from the aqueous electrolyte as well.

(Preparation of Alginate Gel Electrolyte)

The alginate gel electrolyte used in the lithium composite negative electrode D was prepared by introducing and spreading 3 mass % of sodium alginate (trade name: Sodium Alginate 500-600, manufactured by Wako Pure Chemical Corporation) aqueous solution onto a flat glass plate, immersing this into 1 mol/L of a sulfuric acid to obtain a sulfated alginic acid, and subsequently holding the preparation for 5 minutes at room temperature (about 25° C.) and executing crosslinking to form a gel. Next, the hydrated gelatinous film was washed using distilled water, immersed for 24 hours in a large excess of ethanol, and then impregnated with 0.5 mol/L of a LiTFSI (Li(SO$_2$CF$_3$)$_2$N)/PP13TFSI (N-methyl-N-propylpiperidinium bis(trifluoromethanesulfonyl)imide) solution. Subsequently, the film was vacuum-dried for 48 hours at a vacuum degree of 10$^{-2}$ Pa and an ambient temperature of about 70° C. Thus, the alginate gel electrolyte 22 having a thickness of 0.680 mm was prepared.

[Measurement and Evaluation]
(EIS Measurement and Investigation of Polymer Electrolyte)

Electrochemical impedance (EIS) measurements were conducted using the polymer electrolyte (PEO-LiTFSI-BaTiO$_3$) constituting the lithium composite negative electrode A of Comparative Example 1, the polymer electrolyte (PEO-LiTFSI-PP13TFSI) constituting the lithium composite negative electrode B of Comparative Example 2, and the electrolyte (alginate gel electrolyte) constituting the lithium composite negative electrode D of Example 1 as electrolytes. The EIS measurements were conducted using an AC impedance method, with a small potential amplitude, and measuring the impedance of the cell from the voltage and current response signal at the time. Specifically, a cell obtained by sandwiching the electrolyte in a lithium foil was laminated to fabricate the sample, and measurements were conducted at 10$^6$ to 0.1 Hz, an amplitude of 5 mV, OCV (open current potential), and measurement temperatures of 10° C., 20° C., 25° C., 30° C., 40° C., 50° C., 60° C., and 70° C., using an impedance measuring system (manufactured by Solartron Company, models: SI1287 and 1255B).

Figure 2A:
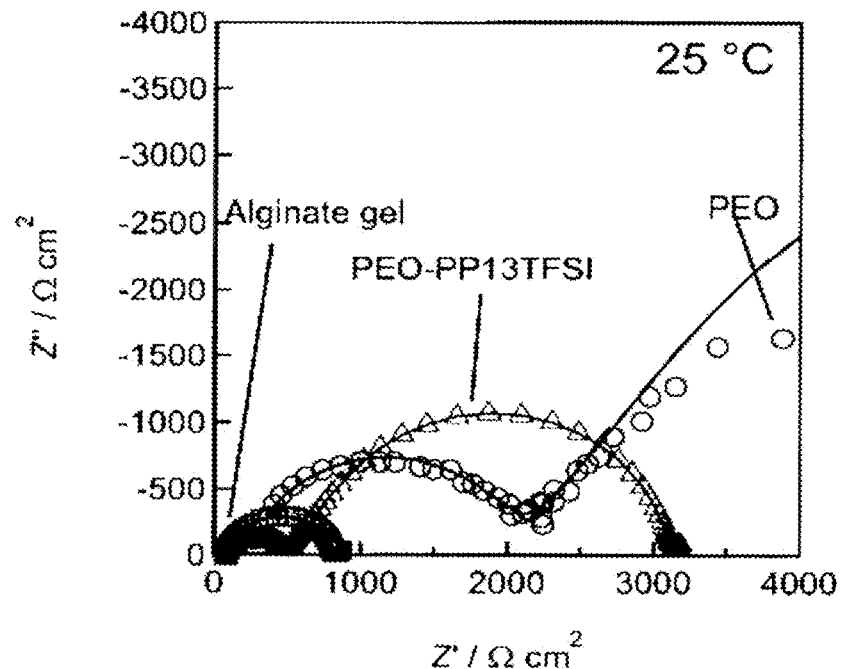
FIGS. 2A and 2B are graphs showing EIS measurement results of each electrolyte (25° C.).
Figure 2B:
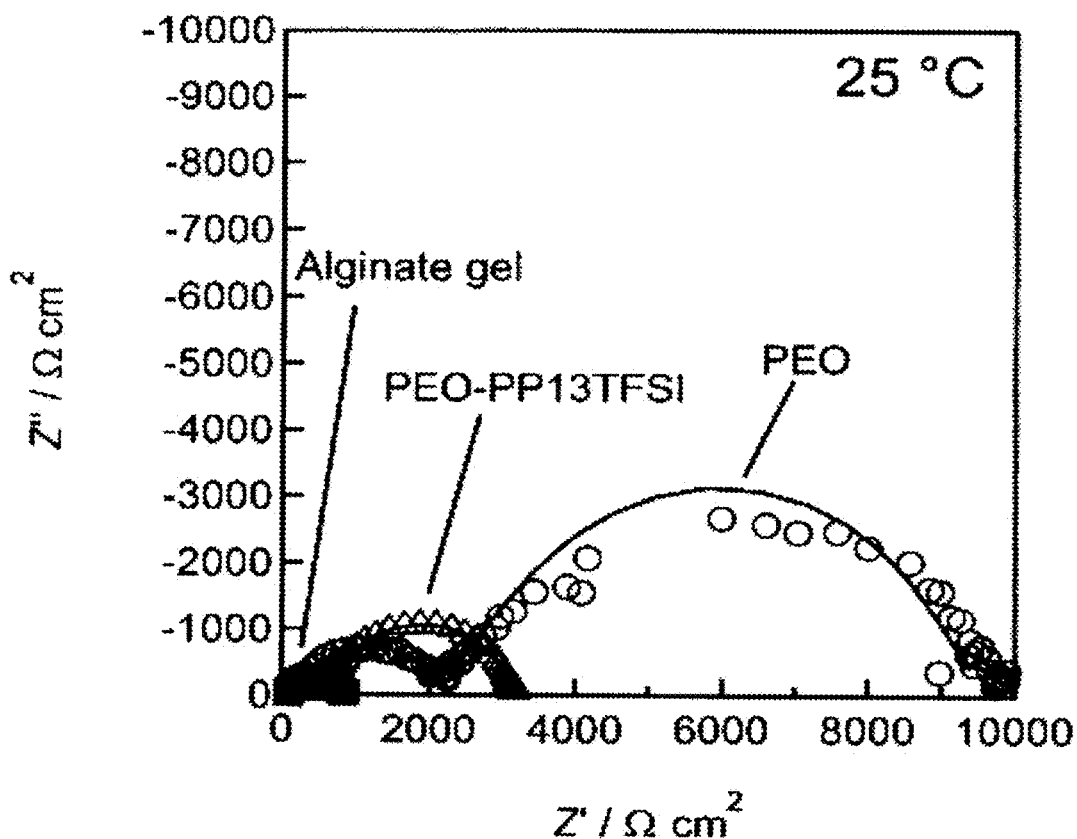
Figure 3:
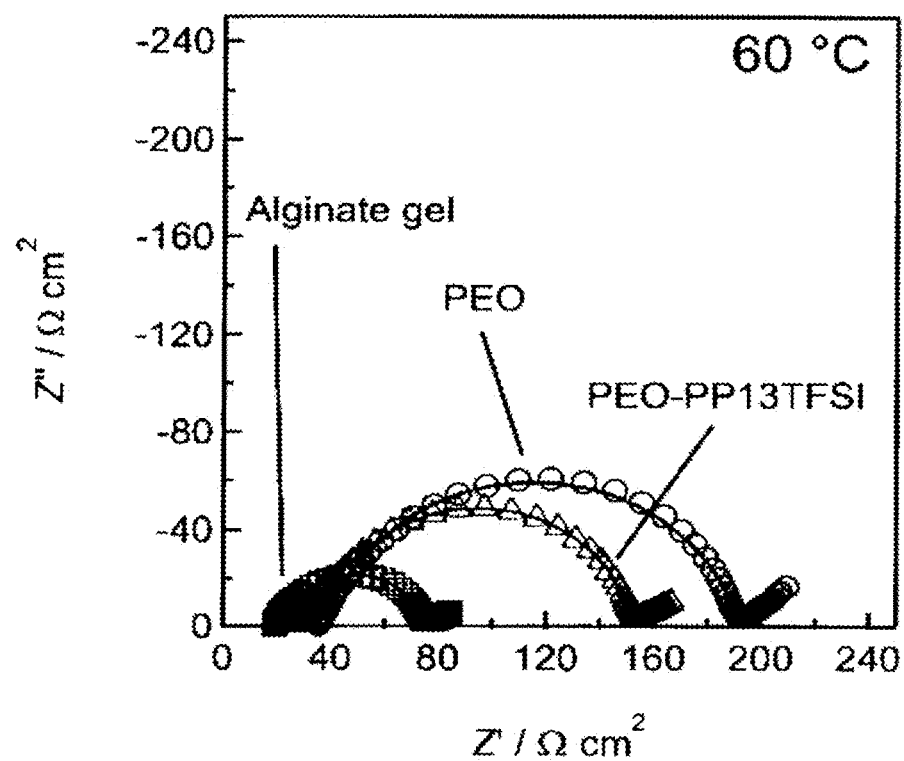
FIG. 3 is a graph showing EIS measurement results of each electrolyte (60° C.).

FIGS. 2A and 2B are graphs showing the EIS measurement results of each polymer electrolyte (25° C.). FIG. 2A is a graph of a scale up to 4000 Ωcm$^2$. FIG. 2B is a graph of a scale up to 10000 Ωcm$^2$. FIG. 3 is a graph showing the EIS measurement results of the polymer electrolyte (60° C.). In DC resistance measurements, while only information of the overall electrochemical system is obtained, deconvoluted analysis can be conducted from the difference in the response frequency of each electrode reaction and ionic conduction from Cole-Cole plots (Nyquist diagrams) obtained by EIS measurements. From high frequency range measurements, the ionic resistance in the polymer electrolyte is regarded as a parallel circuit with the capacitive component. As a result, bulk resistance component, grain boundary resistance component, and interfacial resistance component can be deconvoluted starting from the low resistance side.

According to the results at 60° C. in FIG. 3, while differences were confirmed in each electrolyte, the resistance was low for each. On the other hand, according to the results at 25° C. in FIG. 2, a large interfacial resistance component appeared on the high resistance side with PEO-LiTFSI-BaTiO$_3$. In PEO-LiTFSI-PP13TFSI, while the interfacial resistance component was greatly reduced, a large resistance component still existed. On the other hand, in the alginate gel electrolyte, the resistance was low. Further, Table 1 shows the results in terms of electrical conductivity, and the electrical conductivity of the alginate gel electrolyte at 25° C. was higher than the electrical conductivity of PEO-LiTFSI-BaTiO$_3$ at 60° C. Based on these results, the hybrid capacitor using the alginate gel electrolyte at a room temperature of about 25° C. can be expected to operate at the same level or higher than a hybrid capacitor using PEO-LiTFSI-BaTiO$_3$ at 60° C.

TABLE 1

| | Electrical Conductivity σ (S/cm) | |
|---|---|---|
| | 25° C. | 60° C. |
| PEO-LiTFSI-BaTiO$_3$ | 9.01*10$^{-7}$ | 4.48*10$^{-5}$ |
| PEO-LiTFSI-PP13TFSI | 1.74*10$^{-5}$ | 3.58*10$^{-4}$ |
| Alginate gel electrolyte | 8.67*10$^{-5}$ | 9.46*10$^{-4}$ |

(EIS Measurement and Investigation of Lithium Composite Negative Electrode)

Using the lithium composite negative electrode A of Comparative Example 1, the lithium composite negative electrode C of Comparative Example 3, and the lithium composite negative electrode D of Example 1 as measurement samples of lithium composite negative electrodes, and a platinum electrode as the counter electrode, the lithium composite negative electrode was immersed in 1 mol/L of a lithium sulfate solution at 25° C., and EIS measurements were conducted. Measurements were conducted at 10$^6$ to 0.1 Hz, an amplitude of 5 mV, and OCV, using an impedance measuring system (manufactured by Solartron Company, models: SI1287 and 1255B).

Figure 4A:
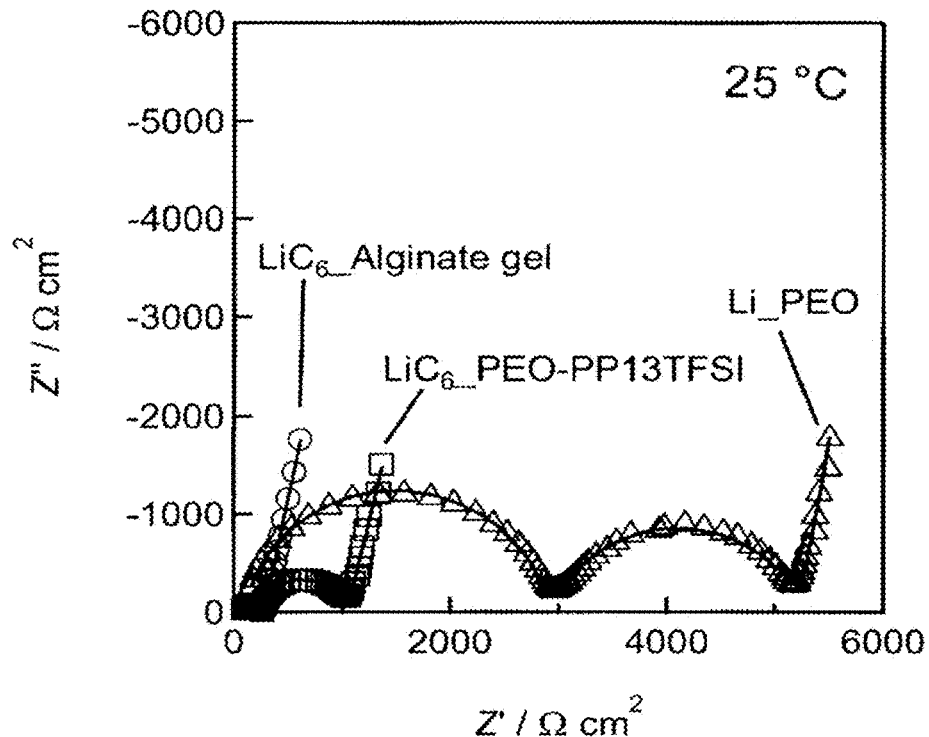
FIGS. 4A and 4B are graphs showing EIS measurement results of each lithium composite negative electrode (25° C.).
Figure 4B:
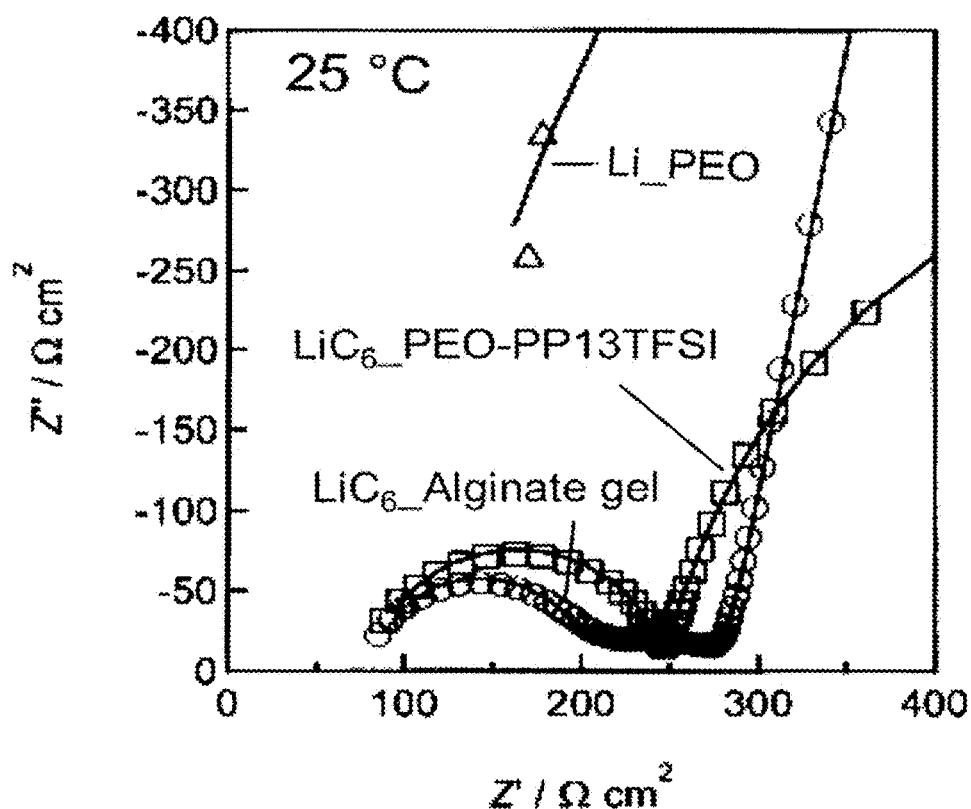

FIGS. 4A and 4B are graphs showing the EIS measurement results of each lithium composite negative electrode (25° C.). FIG. 4A is a graph of a scale up to 6000 Ωcm$^2$. FIG. 4B is a graph of a scale up to 400 Ωcm$^2$. The grain boundary resistance component and the interfacial resistance component were significantly large in the lithium composite negative electrode A, while the grain boundary resistance component was small and the interfacial resistance component was large in the lithium composite negative electrode C. On the other hand, in the lithium composite negative electrode D, the grain boundary resistance component was small, and the interfacial resistance component was so small that the amount could not be confirmed. Further, Table 2 shows the total resistance. The total resistance of the lithium composite negative electrode D comprising the alginate gel electrolyte was decreased to approximately 1/17 of that of the lithium composite negative electrode A comprising PEO-LiTFSI-BaTiO$_3$. Based on these results, the hybrid capacitor provided with the lithium composite negative electrode D comprising the alginate gel electrolyte can be expected to operate at a room temperature of about 25° C.

TABLE 2

| | Total Resistance R (Ωcm$^2$) |
|---|---|
| Lithium composite negative electrode A | 5060 |
| Lithium composite negative electrode C | 912 |
| Lithium composite negative electrode D | 302 |

(Charge-Discharge Measurements and Results of Hybrid Capacitor)

A hybrid capacitor comprising the lithium composite negative electrode D of Example 1 was configured, and charge-discharge measurements were conducted using a two electrode electrochemical cell. Measurements were conducted using the electrochemical cell obtained by immersing the positive electrode 11 and the lithium composite negative electrode D in 1 mol/L of a lithium sulfate aqueous solution having a pH of 4.89 and free of dissolved oxygen. Further, using a silver/silver chloride electrode (HS-205C, manufactured by DKK-TOA Corporation) as a reference electrode, the measured potential was converted to reversible hydrogen electrode (RHE) standards. Charge-discharge measurements were conducted at a temperature of 25° C. and a constant current density of 0.051 and 0.510 mA/cm$^2$. Cut-off potential was set to 3.7 V for charging and 2.7 V for discharging.

Note that, as the positive electrode 11, an activated carbon powder (manufactured by Kansai Coke and Chemicals Co., Ltd., trade name: MSP-20, BET specific surface area: 2200 m$^2$/g, average particle diameter: 8 μm) was provided on an end face of a tip of a cylindrical glassy carbon having a diameter of 5 mm (manufactured by Tokai Carbon Co., Ltd., trade name: GC-20S). Furthermore, 1 mass % of a Nafion (DuPont registered trademark, manufactured by Sigma-Aldrich Co. LLC) alcohol-water mixed solution was dropped thereon. This was then dried to obtain the positive electrode 11. The active material supported on the end face of this positive electrode 11 was 40 μg.

Figure 5A:
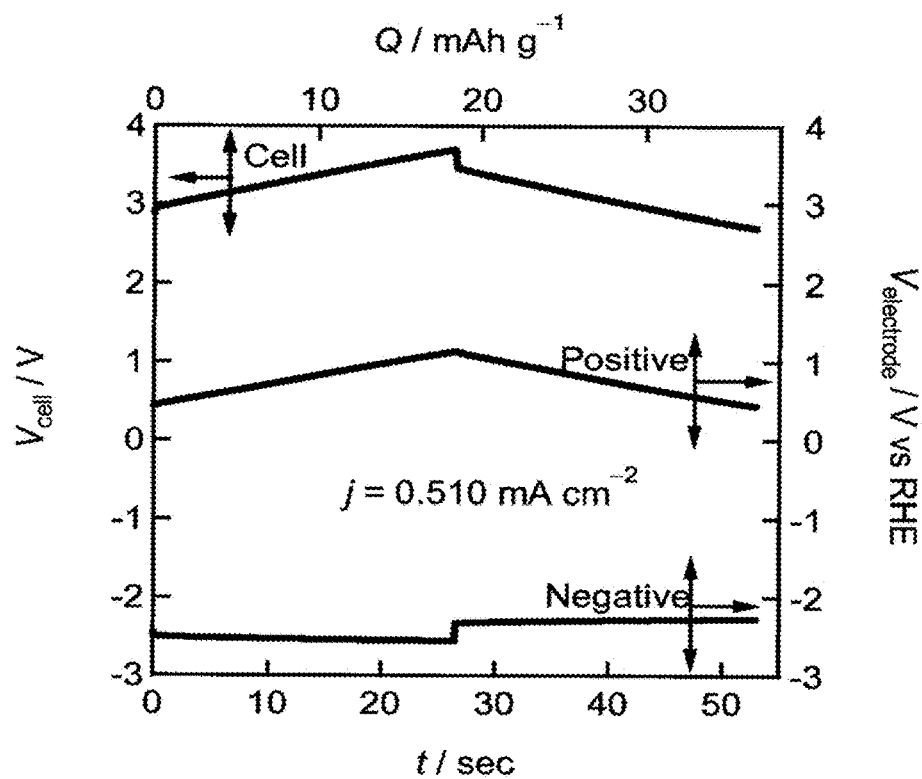
FIGS. 5A and 5B are graphs showing the charge-discharge measurement results of the hybrid capacitor according to the present invention.
Figure 5B:
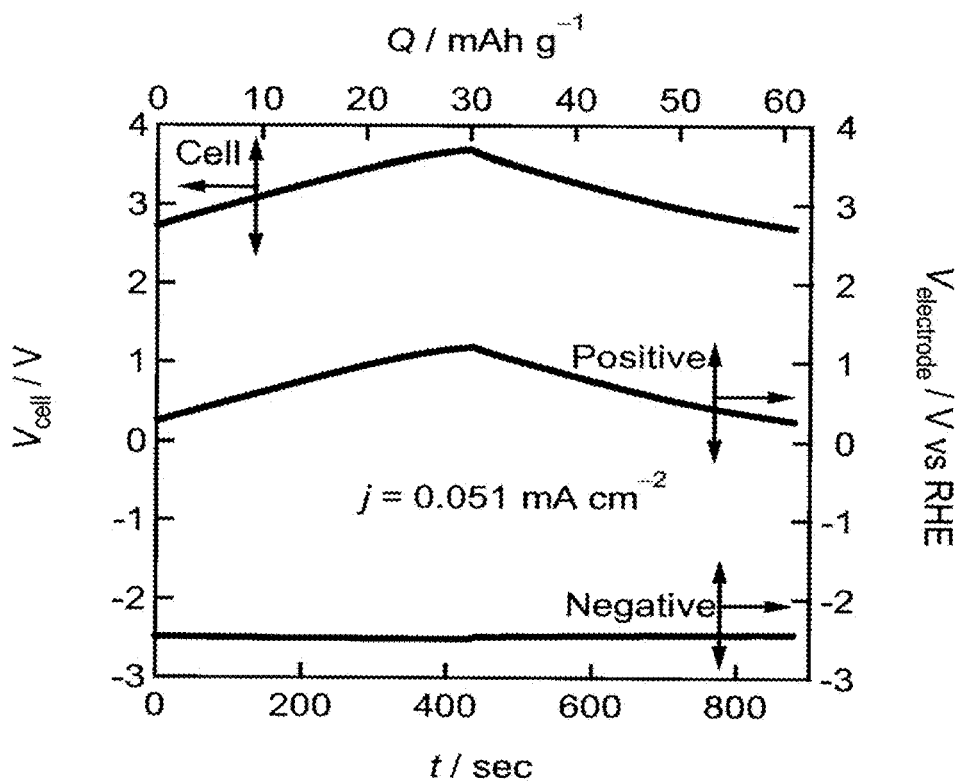

FIGS. 5A and 5B are charge-discharge curves obtained by a charge-discharge test of the obtained hybrid capacitor. FIG. 5A is the result at 0.510 mA/cm$^2$. FIG. 5B is the result at 0.051 mA/cm$^2$. As shown in FIGS. 5A and 5B, the charge-discharge curves change at a constant slope, form a triangular shape, and thus are confirmed to exhibit capacitor-like behavior. Further, a high cell voltage of 3.7 V was obtained, with capacity Q of 31 mAh/(g-positive electrode active material), and a DC-equivalent series resistance (ESR) of 293 Ωcm$^2$ (at 0.510 mA/cm$^2$). Note that Table 3 also shows the DC-ESR results of the hybrid capacitor configured using the lithium composite negative electrode A and the lithium composite negative electrode C.

TABLE 3

|  | DC-ESR (Ωcm$^2$) |
| --- | --- |
| Lithium composite negative electrode A | 4580 |
| Lithium composite negative electrode C | 707 |
| Lithium composite negative electrode D | 293 |

Based on these results, the lithium composite negative electrode D that uses the alginate gel, compared to the lithium composite negative electrodes A and C, achieved significant improvements in charge-discharge characteristics at room temperature, and operation at room temperature was confirmed. The DC-ESR of the lithium composite negative electrode D during charging and discharging decreased significantly more than prior art at room temperature, and the values were confirmed to substantially match the EIS measurement results.

[Evaluation of Lithium-Doped Lithium Composite Negative Electrode from Aqueous Electrolyte]

As the positive electrode, a positive electrode obtained by providing activated carbon fibers (active material weight: 7.26 mg, manufactured by Gun Ei Chemical Industry Co., Ltd., Kynol activated carbon fiber ACC-507-20) on a titanium electrode was used. As a negative electrode, a composite negative electrode was prepared using a graphite electrode prepared in the same manner as in Comparative Example 3 as the negative electrode active material 21 of the composite negative electrode D of Example 1. As the electrolyte, 1 mol/L of a lithium sulfate aqueous solution (25° C., pH 4.89) was used. As a reference electrode, a silver-silver chloride electrode was used. An electrochemical cell was configured by these. The doping of the graphite of the negative electrode with lithium was performed using constant current mode and introducing a current for 196 minutes at a rate of 0.2 C between the positive electrode and the negative electrode.

Figure 6:
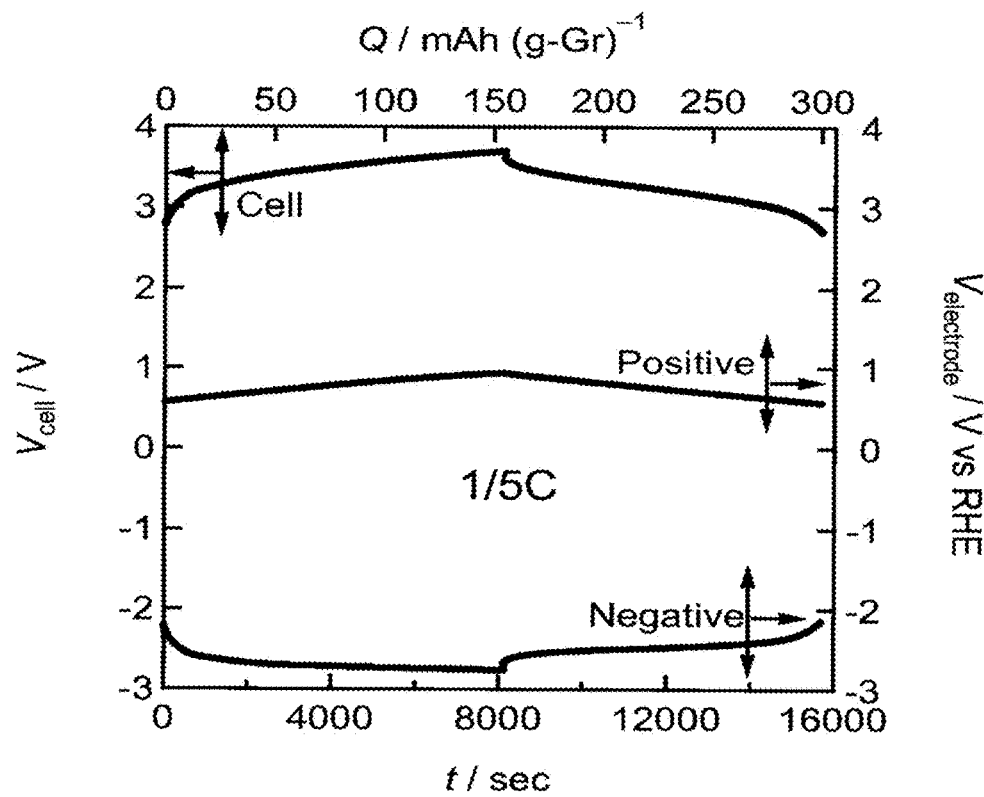
FIG. 6 is a graph showing the charge-discharge measurement results of the hybrid capacitor comprising a lithium composite negative electrode doped with lithium, and the capacity with respect to the amount of active material of the negative electrode.

Using the doped electrochemical cell as is, a charge-discharge test was conducted with the cut-off potential set to 2.7 to 3.7 V. FIG. 6 is a graph showing the charge-discharge measurement results of the hybrid capacitor comprising the lithium composite negative electrode doped with lithium, and the capacity with respect to the amount of active material of the lithium-doped carbon of the negative electrode. This figure shows a charge-discharge curve of a first cycle at 0.2 C with the C-rate based on the positive electrode capacity, and the upper axis indicates capacity assigned by the weight of the negative electrode.

The charging capacity of the negative electrode was 226 mAh/(g-negative electrode active material), and the discharging capacity was 142 mAh/(g-negative electrode active material). The negative electrode potential during charging was decreased from 0.089 to −2.766 V vs. RHE. This indicates that doping was successful from the aqueous electrolyte at room temperature. Thus, even in a case where a hybrid capacitor comprises a lithium composite negative electrode not doped with lithium in advance, it is possible to perform galvanostatic or potentiostatic electrolysis before charging and discharging and dope the Li$^+$ in an aqueous electrolyte into the carbon material.

Example 2: Lithium Composite Negative Electrode E

A lithium composite negative electrode E of Example 2 was configured using a graphite as the negative electrode active material layer 21, alginate gel electrolyte as the electrolyte 22, and LTAP as the solid electrolyte 23. In Example 2, the alginate gel was obtained by crosslinking with CaCl$_2$. Using 0.5 mol/L of LiFSI (solvent: P13FSI) as a lithium salt to be impregnated in the alginate gel, the pre-doping of lithium was carried out using 1 mol/L aqueous Li SO$_4$ (25° C.).

In the lithium composite negative electrode E as well, the graphite 21 was placed on one end of a metal nickel foil serving as the negative electrode current collector 17, and the alginate gel electrolyte cut into a 6-mm square was stacked as the electrolyte 22 on the lithium-doped carbon 21. Furthermore, LTAP cut into a 10-mm square was stacked thereon. Thus, the lithium composite negative electrode E of Example 2 was prepared. Lamination for the lithium composite negative electrode E was performed in the same manner as in Comparative Example 1, providing the measurement window and the like where LTAP was in contact with the aqueous electrolyte 13.

(Preparation of Alginate Gel Electrolyte)

The alginate gel electrolyte used in the lithium composite negative electrode E was prepared by introducing and spreading 3 mass % of aqueous sodium alginate (trade name: Kimica Algin I-3G; manufactured by Kimica Corporation) onto a flat glass plate, immersing this into a 15 mass % of calcium chloride aqueous solution, and subsequently holding the preparation for 30 minutes at room temperature (about 25° C.) and executing crosslinking to form a gel. Next, the hydrated gelatinous film was washed using distilled water and then immersed for 24 hours in a large excess of ethanol. Furthermore, the film was impregnated with 0.5 mol/L of a LiFSI (Li(SO$_2$F)$_2$N)/P13FSI (N-methyl-N-propylpiperidinium bis(fluoromethanesulfonyl)imide) solution. Subsequently, the film was vacuum-dried for 48 hours under a vacuum of 10$^{-2}$ Pa and an ambient temperature of about 70° C. Thus, the alginate gel electrolyte 22 having a thickness of 0.35 mm was prepared.

(EIS Measurement Results of Lithium Composite Negative Electrode E)

Figure 7:
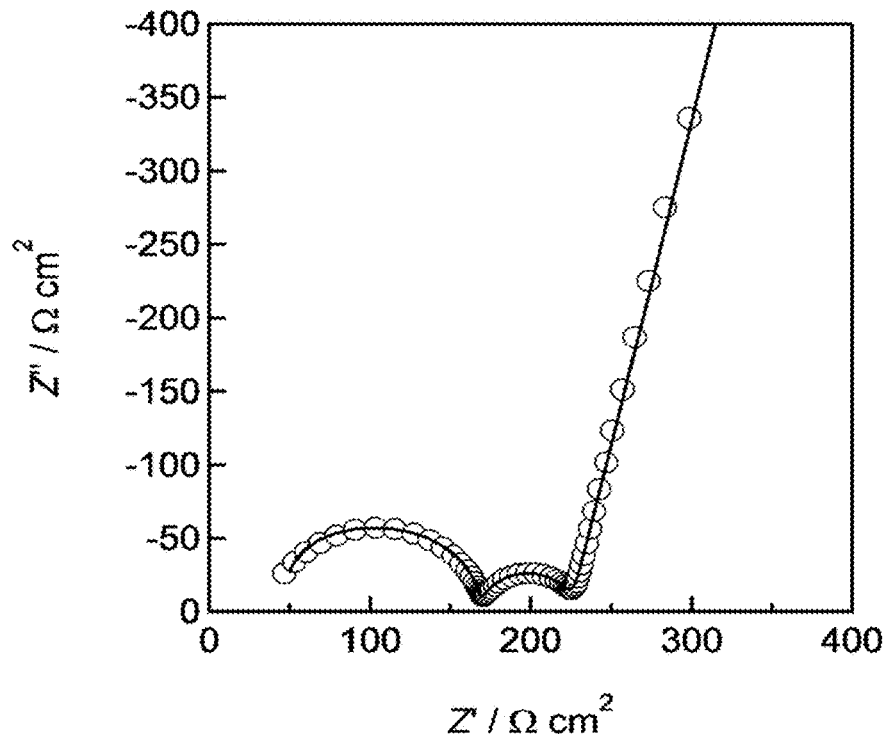
FIG. 7 is a graph showing EIS measurement results of a lithium composite negative electrode E before aqueous electrolyte pre-doping.

EIS measurements of the above-described lithium composite negative electrode E (25° C.) were conducted in the same manner as the above-described EIS measurements in FIGS. 2A to 4B. FIG. 7 is a graph showing the EIS measurement results of the lithium composite negative electrode E before pre-doping. Based on the results, the lithium composite negative electrode E before pre-doping exhibited a sufficiently low resistance.

(Preparation of Lithium-Doped Carbon)

As the graphite 21 used in the lithium composite negative electrode E, a graphite electrode prepared in the same manner as in Comparative Example 3 was used. Next, using this lithium composite negative electrode E as a working electrode and the same charge-discharge measuring system as described above, the graphite electrode was doped with lithium from an aqueous electrolyte to obtain the lithium-doped carbon 21. Specifically, as the positive electrode, a positive electrode obtained by providing activated carbon fibers (active material weight: 15 mg, manufactured by Gun Ei Chemical Industry Co., Ltd., Kynol activated carbon fiber ACC-507-20) on a titanium electrode was used. As the negative electrode, the lithium composite negative electrode E was used. As the aqueous electrolyte, 1 mol/L of a lithium sulfate aqueous solution (25° C., pH 4.89) was used. As a reference electrode, a silver-silver chloride electrode was used. Then, an electrochemical cell was configured using these, and the graphite of the negative electrode was doped with lithium using this electrochemical cell. At this time, using constant current mode, doping was performed by introducing a current up to 600 mAh (g-negative electrode active material)$^{-1}$ at a rate of 0.05 C between the positive electrode and the negative electrode.

(Charge-Discharge Measurements and Results of Hybrid Capacitor)

A hybrid capacitor comprising the lithium composite negative electrode E was configured, and charge-discharge measurements were conducted using a bipolar electrochemical measurement cell. During the pre-doping from the aqueous electrolyte, the negative electrode potential gradually decreased, and the negative electrode potential at the doping capacity of 600 mAh (g-negative electrode active material)$^{-1}$ was −2.67 V (vs. RHE). Furthermore, a de-doping process of 100 mAh (g-negative electrode active material)$^{-1}$ was performed. With such pre-doping, the electrode exhibited typical behavior for LiC$_6$. Measurements were conducted using the same two-electrode electrochemical cell as in Example 1 described above. As the positive electrode, a positive electrode obtained by providing activated carbon fibers (active material weight: 3.64 mg, manufactured by Gun Ei Chemical Industry Co., Ltd., Kynol activated carbon fiber ACC-507-20) on a titanium electrode was used. Charge-discharge measurements were conducted at a temperature of 25° C. using a current value corresponding to 1 C as a constant current density. Further, as the charge-discharge mode, CC charging was conducted to 3.7 V, CV holding was conducted at 3.7 V until the current value attenuated to the value corresponding to 0.1 C, and subsequently CC discharging was conducted to 2.7 V.

Figure 8:
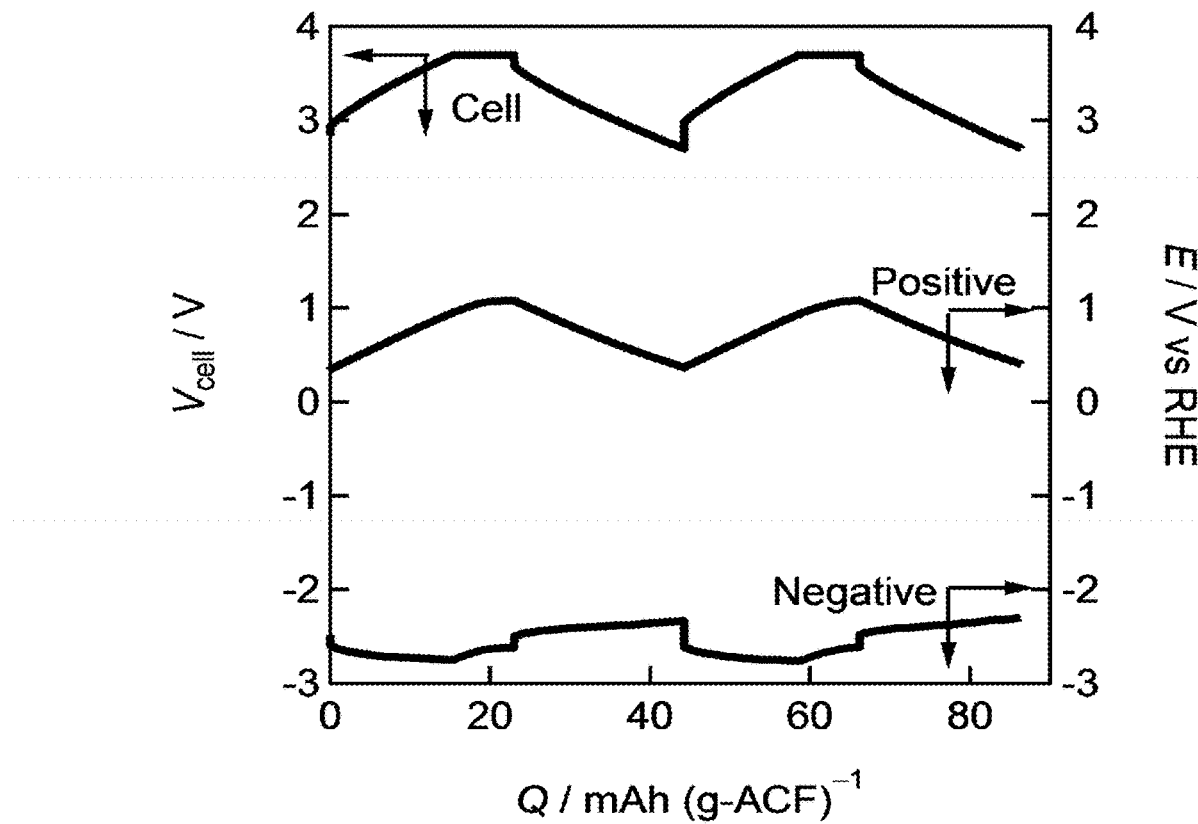
FIG. 8 is a graph showing the charge-discharge measurement results of the hybrid capacitor of Example 2.
Figure 9:
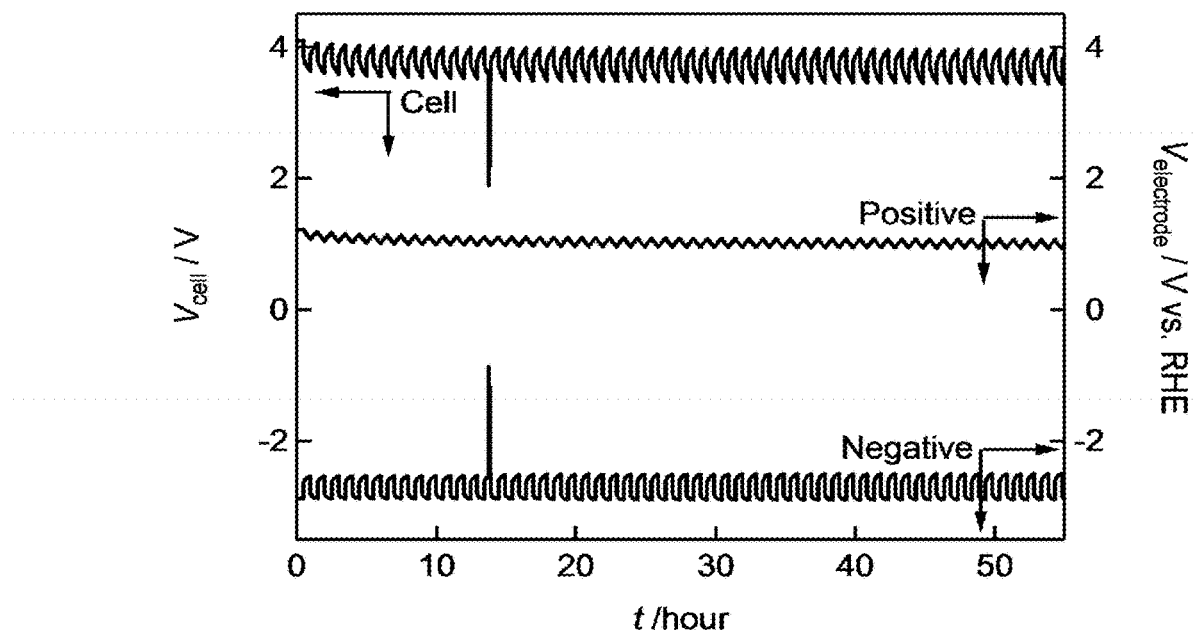
FIG. 9 is a graph showing the charge-discharge cycle measurement results of the hybrid capacitor of Example 2 under capacity controlled conditions.

FIG. 8 is a graph showing the charge-discharge measurement results of the hybrid capacitor obtained. As shown in FIG. 8, from the charge-discharge curve at 1 C, capacitor-like behavior is confirmed to be exhibited at 25° C. Further, the specific capacity and specific electrostatic capacity calculated from the discharge curve were 20.2 mAh (g-positive electrode active material)$^{-1}$ and 84.5 F (g-positive electrode active material)$^{-1}$, exhibiting excellent capacitor characteristics as an aqueous hybrid capacitor at 1 C. Thus, pre-doping in an aqueous electrolyte makes electrode preparation easier than the conventional pre-doping of a separate cell, and equal or superior characteristics are achieved. Note that FIG. 9 shows the charge-discharge cycle measurement results under the capacity controlled conditions (100 mAh (g-negative electrode active material)$^{-1}$) of the hybrid capacitor. The results of FIG. 9 show that the negative electrode potential is relatively stable and, compared to pre-doping by a separate cell, the lithium composite negative electrode E pre-doped from an aqueous electrolyte achieved equal or superior characteristics, including cycle characteristics as well.

Reference Example 1: Lithium Composite Negative Electrode F

A lithium composite negative electrode F of Reference Example 1 was configured using graphite as the negative electrode active material layer 21, a separator impregnated with 0.5 mol/L of LiFSI/P13FSI solution in place of the polymer electrolyte 22, and LTAP as the solid electrolyte 23. This Reference Example 1 differs from the lithium composite negative electrode E of Example 2 in that the LiFSI/P13FSI solution to be impregnated in the alginate gel was impregnated in the separator, without using the alginate gel as the polymer electrolyte 22.

In the lithium composite negative electrode F as well, the graphite 21 was placed on one end of a metal nickel foil serving as the negative electrode current collector 17, and the separator cut into a 6-mm square was layered in place of the polymer electrolyte 22 on the graphite 21. Furthermore, LTAP cut into a 10-mm square was layered thereon. Thus, the lithium composite negative electrode F of Reference Example 1 was prepared. Lamination for lithium composite negative electrode F was performed in the same manner as in Comparative Example 1, providing the measurement window and the like where LTAP was in contact with the aqueous electrolyte 13.

(Preparation of Separator)

As the separator used in the lithium composite negative electrode F, an LiFSI/P13FSI impregnated separator was prepared by impregnating a glass fiber filter paper (Whatman GF/A) with a few drops of 0.5 mol/L of LiFSI (Li(SO$_2$F)$_2$N)/P13FSI (N-methyl-N-propylpiperidinium bis(fluoromethanesulfonyl)imide) solution.

(Preparation of Lithium-Doped Carbon)

As the graphite 21 used in the lithium composite negative electrode F, a graphite electrode prepared in the same manner as in Comparative Example 3 was used. Next, using this lithium composite negative electrode F as a working electrode and the same charge-discharge measuring system as described above, the graphite electrode was doped with lithium from an aqueous electrolyte to obtain the lithium-doped carbon 21. Specifically, as the positive electrode, a positive electrode obtained by providing activated carbon fibers (active material weight: 15 mg, manufactured by Gun Ei Chemical Industry Co., Ltd., Kynol activated carbon fiber ACC-507-20) on a titanium electrode was used. As the negative electrode, the lithium composite negative electrode F was used. As the aqueous electrolyte, 1 mol/L of a lithium sulfate aqueous solution (25° C., pH 4.89) was used. As a reference electrode, a silver-silver chloride electrode was used. Then, an electrochemical cell was configured using these, and the graphite of the negative electrode was doped with lithium using this electrochemical cell. At this time, using constant current mode, doping was performed by introducing a current for 26 hours at a rate of 0.05 C between the positive electrode and the negative electrode.

With the pre-doping of lithium ions, the negative electrode potential gradually decreased to −2.69 V (vs. RHE). The capacity at the time of doping of the lithium ions was 483 mAhg$^{-1}$. The graphite in the negative electrode was sufficiently doped with lithium ions, and the negative electrode potential was decreased.

(Charge-Discharge Measurements and Results of Hybrid Capacitor)

A hybrid capacitor comprising the lithium composite negative electrode F of Reference Example 1 was configured, and charge-discharge measurements were conducted using a two-electrode electrochemical cell. Measurements were conducted in the same manner as in Example 2 described above and, since the same method was also used for the positive electrode, description thereof will be omitted here.

Figure 10:
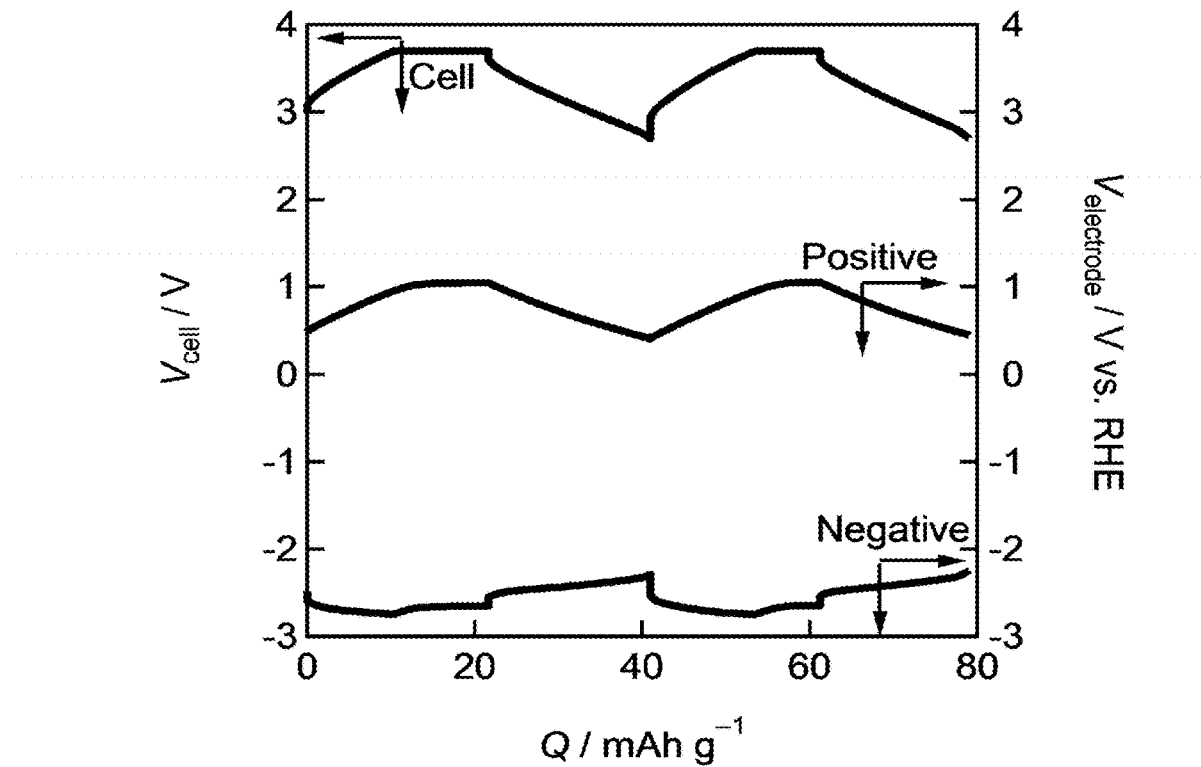
FIG. 10 is a graph showing the charge-discharge measurement results of the hybrid capacitor of Reference Example 1.
Figure 11:
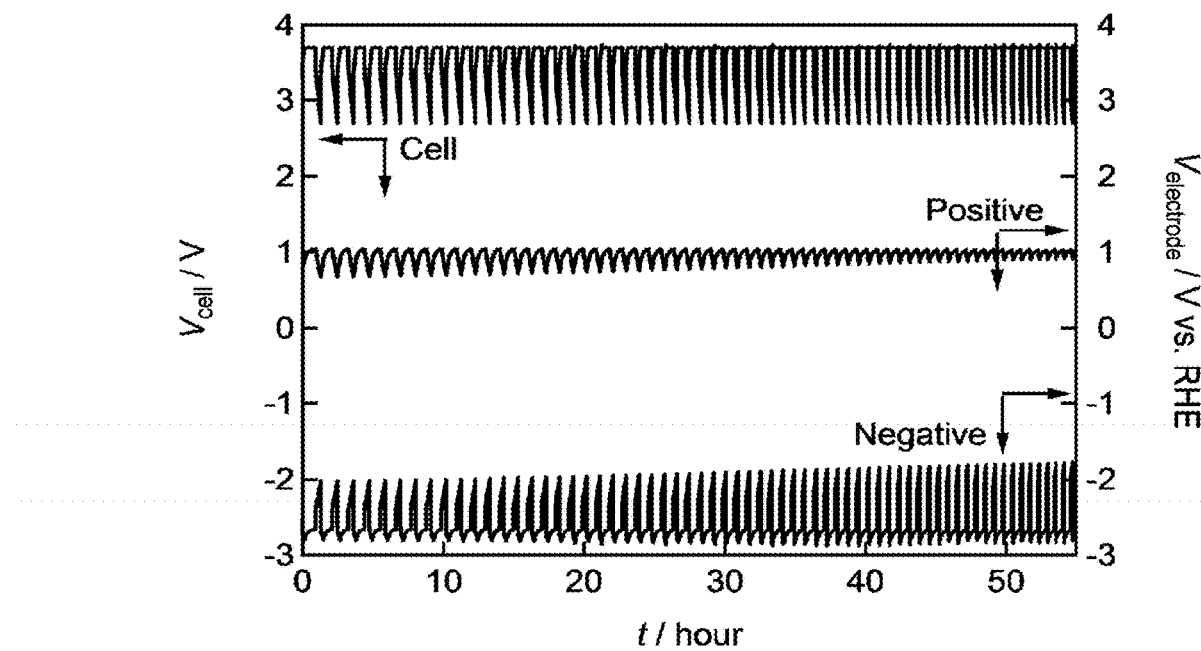
FIG. 11 is a graph showing the cycle measurement results of CC-CV (constant current-constat voltage) charging and discharging of the hybrid capacitor of Reference Example 1.

FIG. 10 is a graph showing the charge-discharge measurement results of the hybrid capacitor obtained. As shown in FIG. 10, the charge-discharge curve is confirmed to exhibit capacitor-like behavior. Further, since a specific capacity of 19 mAh (g-positive electrode active material)$^{-1}$ is obtained at 0.5 C, the process from aqueous electrolyte pre-doping to the hybrid capacitor can be expected. Note that FIG. 11 shows the cycle measurement results at CC-CV charging and discharging at 1 C of the hybrid capacitor. The results of FIG. 11 show that the change in negative electrode potential is relatively stable, and the same level of cycle characteristics can be obtained using the LiFSI/P13FSI impregnated separator as well.

Based on the results of Reference Example 1 above, even when a separator impregnated with a LiTFSI/P13FSI solution to be impregnated in the alginate gel is used without usage of the alginate gel as the polymer electrolyte 22, achievement of the same level of capacitor characteristics can be expected.

DESCRIPTIONS OF REFERENCE NUMERALS

1 Hybrid capacitor
11 Positive electrode (metal oxide electrode)
12 Negative electrode (lithium composite negative electrode)
13 Neutral aqueous electrolyte
16 Positive electrode current collector
17 Negative electrode current collector
18 Container
21 Lithium-doped carbon (negative electrode active material layer)
22 Alginate gel electrolyte (polymer electrolyte)
23 Lithium ion conductive solid electrolyte (solid electrolyte)

What is claimed is:

1. A method for manufacturing a hybrid capacitor, comprising:
   forming a laminar electrode comprising a lithium ion conductive solid electrolyte, an alginate gel electrolyte, and a carbon material not doped with lithium;
   forming a cell comprising a positive electrode comprising a carbon material, a metal oxide, or a mixture thereof, the laminar electrode comprising a lithium ion conductive solid electrolyte, an alginate gel electrolyte, and a carbon material not doped with lithium as a negative electrode, and a neutral aqueous electrolyte filled between the positive electrode and the negative electrode;
   electrically connecting the negative electrode with the positive electrode in the cell; and
   performing galvanostatic or potentiostatic electrolysis such that lithium is doped into the carbon material of the laminar electrode from the neutral aqueous electrolyte, thereby obtaining a laminar electrode comprising a lithium-doped carbon, and that a hybrid capacitor comprising the positive electrode, the laminar electrode, comprising the lithium-doped carbon as a negative electrode active material, as a lithium composite negative electrode, and the neutral aqueous electrolyte filled between the positive electrode and the negative electrode is formed.

2. The method of claim 1, wherein the alginate gel electrolyte is a gelatinous electrolyte obtained by impregnating an alginate gel obtained by crosslinking an alginic acid or an alginate with a lithium salt.

3. The method of claim 1, wherein the alginate is at least one selected from the group consisting of a potassium alginate, sodium alginate, ammonium alginate, calcium alginate, magnesium alginate, and iron alginate.

4. The method of claim 1, wherein the lithium salt is at least one selected from the group consisting of LiPF$_6$, LiClO$_4$, LiBF$_4$, LiTFSI (Li(SO$_2$CF$_3$)$_2$N), Li(SO$_2$C$_2$F$_5$)$_2$N, and lithium bisoxalato borate (LiBOB).

5. The method of claim 1, wherein the neutral aqueous electrolyte is at least one salt selected from the group consisting of LiCl, LiNO$_3$, Li$_2$SO$_4$, Li$_2$CO$_3$, Li$_2$HPO$_4$, 4LiH$_2$PO$_4$, LiCOOCH$_3$, LiCOO(OH)CHCH$_3$, Li$_2$C$_2$O$_2$, NaCl, Na$_2$SO$_4$, KCl, and K$_2$SO$_4$, and has a pH of from 5 to 8.5.

6. A method for manufacturing a laminar electrode, the method comprising:
   forming a cell comprising a counter electrode comprising a carbon material, a metal oxide or a combination thereof, the laminar electrode comprising a lithium ion conductive solid electrolyte, an alginate gel electrolyte, and a carbon material not doped with lithium as a working electrode, and a neutral aqueous electrolyte filled between the counter electrode and the working electrode;
   electrically connecting the working electrode with the counter electrode in the cell; and
   performing galvanostatic or potentiostatic electrolysis such that lithium is doped into the carbon material in the working electrode from the neutral aqueous electrolyte and that a laminar electrode comprising the lithium ion conductive solid electrolyte, the alginate gel electrolyte, and a lithium-doped carbon is formed.

7. The method of claim 6, wherein the alginate gel electrolyte is a gelatinous electrolyte obtained by impregnating an alginate gel obtained by crosslinking an alginic acid or an alginate with a lithium salt.

8. The method of claim 6, wherein the alginate is at least one selected from the group consisting of a potassium alginate, sodium alginate, ammonium alginate, calcium alginate, magnesium alginate, and iron alginate.

9. The method of claim 6, wherein the lithium salt is at least one salt elected from the group consisting of LiPF$_6$, LiClO$_4$, LiBF$_4$, LiTFSI (Li(SO$_2$CF$_3$)$_2$N), Li(SO$_2$C$_2$F$_5$)$_2$N, and lithium bisoxalato borate (LiBOB).

* * * * *